(12) United States Patent
Yamamoto

(10) Patent No.: US 7,022,642 B2
(45) Date of Patent: Apr. 4, 2006

(54) ELECTROCATALYST AND METHOD OF MANUFACTURING THE SAME

(75) Inventor: Shinji Yamamoto, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/878,048

(22) Filed: Jun. 29, 2004

(65) Prior Publication Data

US 2005/0003959 A1    Jan. 6, 2005

(30) Foreign Application Priority Data

Jul. 2, 2003    (JP) ............... 2003-270469
May 21, 2004   (JP) ............... 2004-151927

(51) Int. Cl.
  *B01J 21/18*   (2006.01)
  *B01J 31/00*   (2006.01)
  *B01F 17/00*   (2006.01)

(52) U.S. Cl. ............... 502/185; 502/102; 502/104; 516/22

(58) Field of Classification Search ............ 502/102, 502/104, 185; 516/22
See application file for complete search history.

(56) References Cited

U.S. PATENT DOCUMENTS

| | | | |
|---|---|---|---|
| 3,992,331 A * | 11/1976 | Petrow et al. | ............... 502/339 |
| 4,031,292 A * | 6/1977 | Hervert | ............... 502/101 |
| 4,425,261 A | 1/1984 | Stenius et al. | |
| 4,593,016 A * | 6/1986 | Amelio et al. | ............... 502/339 |
| 4,714,692 A * | 12/1987 | Abrevaya et al. | ............ 502/261 |
| 4,714,693 A * | 12/1987 | Targos | ......................... 502/261 |
| 4,945,116 A * | 7/1990 | Abrevaya | .................... 518/715 |
| 5,028,498 A | 7/1991 | Lindstrom | |
| 5,059,574 A * | 10/1991 | Abrevaya | .................... 502/261 |
| 5,133,955 A * | 7/1992 | Raghavan et al. | ........ 423/592.1 |
| 6,066,410 A * | 5/2000 | Auer et al. | .................... 429/40 |
| 6,413,489 B1* | 7/2002 | Ying et al. | ................... 423/600 |
| 6,428,931 B1* | 8/2002 | Golovin | ....................... 429/224 |
| 6,482,997 B1* | 11/2002 | Petit-Clair et al. | ........... 585/250 |
| 6,602,821 B1* | 8/2003 | Petit-Clair et al. | ........... 502/306 |

(Continued)

FOREIGN PATENT DOCUMENTS

EP    1338361    * 8/2003

(Continued)

OTHER PUBLICATIONS

E. A. Ticianelli et al., "Localization of platinum in low catalyst loading electrodes to attain high power densities in SPE fuel cells," J. Electroanal. Chem., 251, 1988, pp. 275-295, no month.

(Continued)

*Primary Examiner*—J. A. Lorengo
*Assistant Examiner*—Patricia L. Hailey
(74) *Attorney, Agent, or Firm*—Foley & Lardner LLP

(57) ABSTRACT

An electrocatalyst contains a conductive support which loads a noble metal thereon. In the electrocatalyst of the present invention, the noble metal is formed by adding a reducing agent for an ion of the noble metal to a reversed micellar solution containing an aqueous solution of the noble metal ion, and the noble metal is loaded with a mean particle diameter ranging from 1 to 10 nm.

30 Claims, 10 Drawing Sheets

U.S. PATENT DOCUMENTS

| | | | |
|---|---|---|---|
| 6,797,667 B1* | 9/2004 | Ruth et al. | 502/182 |
| 2002/0110519 A1* | 8/2002 | Ying et al. | 423/600 |
| 2003/0091890 A1 | 5/2003 | Fukuda et al. | |
| 2004/0157109 A1* | 8/2004 | Yan et al. | 429/44 |
| 2005/0075240 A1* | 4/2005 | Yamamoto | 502/101 |

FOREIGN PATENT DOCUMENTS

| | | |
|---|---|---|
| JP | 62-163746 A | 7/1987 |
| JP | 9-167622 A | 6/1997 |

OTHER PUBLICATIONS

M.M. Escudero et al., "Development and performance characterization of new electrocatalysts for PEMFC", Journal of Power Sources, 2002, pp. 206-214, vol. 106, no month.

Masahiro Kishida, et al., "Hydrogenation of carbon dioxide over metal catalysts prepared using microemulsion", Catalysis Today, 1996, pp. 355-359, vol. 29, no month.

* cited by examiner

FIG.3
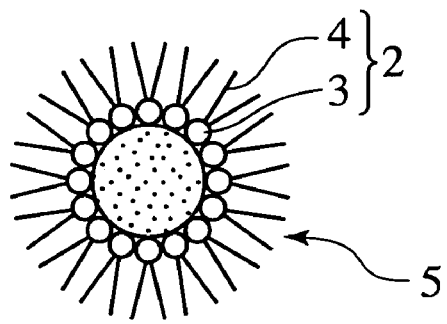
(A)
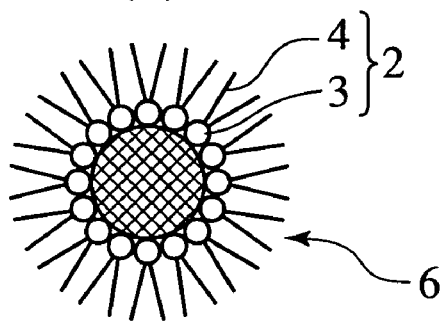
(B)
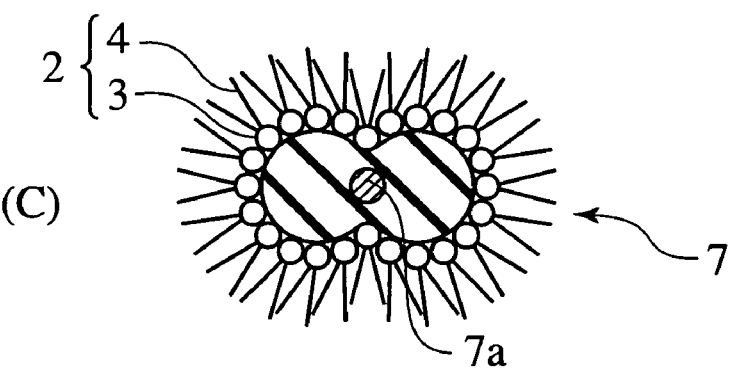
(C)
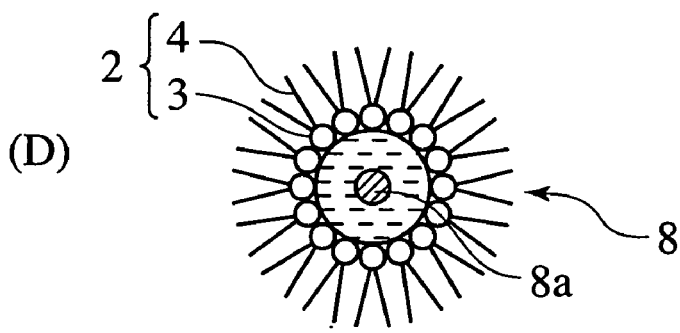
(D)

FIG.11A

| | CATALYST | BET SPECIFIC SURFACE AREA OF CARBON SUPPORT (m²/g) | MEAN PARTICLE DIAMETER (nm) | MASS ACTIVITY (A/g-Pt) |
|---|---|---|---|---|
| Ex.1 | Pt/KetjenblackEC600JD | 1270 | 2.5 | 134 |
| Ex.2 | $Pt_{0.75}Co_{0.25}$/KetjenblackEC600JD | 1270 | 3.5 | 158 |
| Ex.3 | $Pt_{0.75}Co_{0.25}$/KetjenblackEC600JD | 1270 | 3.5 | 159 |
| Ex.4 | $Pt_{0.75}Co_{0.25}$/KetjenblackEC600JD | 1270 | 3.5 | 158 |
| Ex.5 | $Pt_{0.75}Co_{0.25}$/KetjenblackEC600JD | 1270 | 3.5 | 157 |
| Ex.6 | $Pt_{0.50}Co_{0.50}$/KetjenblackEC600JD | 1270 | 3.5 | 172 |
| Ex.7 | $Pt_{0.75}Cr_{0.25}$/KetjenblackEC600JD | 1270 | 3.5 | 144 |
| Ex.8 | $Pt_{0.75}Mn_{0.25}$/KetjenblackEC600JD | 1270 | 3.5 | 151 |
| Ex.9 | $Pt_{0.75}Fe_{0.25}$/KetjenblackEC600JD | 1270 | 3.5 | 173 |
| Ex.10 | $Pt_{0.75}Ni_{0.25}$/KetjenblackEC600JD | 1270 | 3.5 | 147 |
| Ex.11 | Pt/KetjenblackEC | 805 | 2.2 | 144 |
| Ex.12 | $Pt_{0.75}Co_{0.25}$/KetjenblackEC | 805 | 2.9 | 185 |
| Ex.13 | $Pt_{0.75}Ir_{0.25}$/KetjenblackEC | 805 | 2.6 | 202 |
| Ex.14 | Pt/Vulcan XC72 | 280 | 2.9 | 137 |
| Ex.15 | Pt/Acetyleneblack | 120 | 3.3 | 129 |
| Ex.16 | Pt/Vulcite | 180 | 3.4 | 118 |
| Ex.17 | Pt/Furnaceblack | 120 | 3.7 | 128 |

FROM FIG.11A

| | | | |
|---|---|---|---|
| Ex.18 | Pt/Graphitized KetjenblackEC | 125 | 3.1 | 131 |
| Ex.19 | Pt/Graphitized KetjenblackEC600JD | 225 | 2.9 | 133 |
| Ex.20 | Pt/Graphitized Vulcan XC72 | 90 | 3.2 | 128 |
| Ex.21 | Pt/Graphitized Acetyleneblack | 85 | 3.4 | 116 |
| Ex.22 | Pt/Graphitized Furnaceblack | 88 | 3.6 | 112 |
| Ex.23 | $Pt_{0.75}Co_{0.25}$/Graphitized KetjenblackEC | 125 | 3.5 | 163 |
| Ex.24 | $Pt_{0.75}Co_{0.25}$/Graphitized KetjenblackEC | 125 | 3.6 | 164 |
| Ex.25 | $Pt_{0.75}Co_{0.25}$/Graphitized KetjenblackEC | 125 | 3.5 | 166 |
| Ex.26 | $Pt_{0.75}Co_{0.25}$/Graphitized KetjenblackEC | 125 | 3.5 | 164 |
| Ex.27 | $Pt_{0.50}Co_{0.50}$/Graphitized KetjenblackEC | 125 | 3.9 | 187 |
| Ex.28 | $Pt_{0.75}Cr_{0.25}$/Graphitized KetjenblackEC | 125 | 3.3 | 165 |
| Ex.29 | $Pt_{0.75}Mn_{0.25}$/Graphitized KetjenblackEC | 125 | 3.2 | 167 |
| Ex.30 | $Pt_{0.75}Fe_{0.25}$/Graphitized KetjenblackEC | 125 | 3.4 | 166 |
| Ex.31 | $Pt_{0.75}Ni_{0.25}$/Graphitized KetjenblackEC | 125 | 3.2 | 158 |
| Ex.32 | $Pt_{0.75}Ir_{0.25}$/Graphitized KetjenblackEC | 125 | 2.9 | 201 |
| Com. Ex.1 | Pt/Vulcan XC72 | 280 | 4.5 | 43 |
| Com. Ex.2 | $Pt_{0.75}Co_{0.25}$/Vulcan XC72 | 280 | 5.5 | 77 |
| Com. Ex.3 | Pt/KetjenblackEC600JD | 1270 | 3.5 | 68 |
| Com. Ex.4 | $Pt_{0.75}Co_{0.25}$/KetjenblackEC600JD | 1270 | 4.5 | 86 |
| Com. Ex.5 | Pt/Graphitized Ketjenblack | 125 | 5.8 | 34 |
| Com. Ex.6 | $Pt_{0.75}Co_{0.25}$/Graphitized Ketjenblack | 125 | 6.4 | 41 |

ELECTROCATALYST AND METHOD OF MANUFACTURING THE SAME

BACKGROUND OF THE INVENTION

1. Field of the Invention

The present invention relates to an electrocatalyst and a method of manufacturing the same. More specifically, the present invention relates to an electrocatalyst prepared by a step of forming a reversed micellar solution which dissolves a catalyst component in micelles, a step of obtaining noble metal particles or complex metal particles by adding a reducing agent to the reversed micellar solution, and a step of loading the metal particles on a conductive support by mixing the conductive support into the reversed micellar solution.

2. Description of the Related Art

A hydrogen-oxygen fuel cell is classified into a variety of types in accordance with types of electrolytes, types of electrodes and the like. As typical fuel cells, there are ones of an alkaline type, a phosphoric acid type, a molten carbonate type, a solid electrolyte type, and a solid polymer type. Among them, the solid polymer fuel cell operatable at low temperature (usually, 100° C. or less) has gained attention, and in recent years, has been developed and put into practical use as a low-pollution power source for a vehicle.

As an electrocatalyst usable for such a fuel cell, there is one in which catalyst particles are loaded on carbon particles. Meanwhile, in order that such catalyst-loaded carbon particles may be far more widely used as the electrocatalyst of the fuel cell, it is necessary to minimize a usage amount of the catalyst by enhancing a utilization of the catalyst without lowering activity thereof, and to reduce a manufacturing cost of the catalyst by simplifying a manufacturing method thereof.

Heretofore, platinum-loaded carbon has been used in many fuel cells. In general, a method of manufacturing the platinum-loaded carbon is that a carbon support is added to a solution of chloroplatinic acid, a reducing agent is added to the precipitate to reduce the solution to platinum particles, and the platinum particles are adsorbed on the carbon support (refer to Japanese Patent Application Laid-Open No. H9-167622).

Meanwhile, in an oxygen reduction electrode for use in the fuel cell, oxygen reduction overvoltage is large, which is a main cause to lower efficiency of the fuel cell. For the electrocatalyst, noble metal such as platinum (Pt) and ruthenium (Ru) is used as a reaction catalyst for protons and oxygen. However, in such an electrocatalyst composed only of the noble metal, oxygen reduction activity is insufficient in some cases, and an oxygen reduction electrocatalyst that is high activity is required. An alloy or intermetallic compound of the noble metal, particularly Pt, and a base metal is known to exhibit an oxygen reduction activity higher than the electrocatalyst only of Pt, and it has also been proposed to use such a Pt-based alloy catalyst as the electrocatalyst for the fuel cell (refer to Japanese Patent Application Laid-Open No. S62-163746).

SUMMARY OF THE INVENTION

However, some reports tell that, in the electrode for the fuel cell, which is fabricated by the conventional manufacturing method, the utilization of the platinum in the catalyst is in the level of 10%. It is assumed that many catalysts do not contribute to the reaction (E. A. Ticianelli, J. Electroanal. Chem., 251, 275 (1988)).

The present invention has been created in order to solve such problems as described above. It is an object of the present invention to provide an electrocatalyst for a fuel cell, which remarkably improves a catalyst utilization to enhance performance of the fuel cell. It is another object of the present invention to provide a method for manufacturing catalyst-loaded carbon by a manufacturing method simpler than a conventional one.

The first aspect of the present invention provides an electrocatalyst comprising: a conductive support which loads a noble metal thereon, wherein the noble metal is formed by adding a reducing agent for an ion of the noble metal to a reversed micellar solution containing an aqueous solution of the noble metal ion, and the noble metal is loaded with a mean particle diameter ranging from 1 to 10 nm.

The second aspect of the present invention provides a method of manufacturing an electrocatalyst comprising: preparing a reversed micellar solution containing an aqueous solution of a noble metal ion; reducing the noble metal ion to a noble metal by adding a reducing agent to the reversed micellar solution; and adding a conductive support to the reversed micellar solution.

The third aspect of the present invention provides a method of manufacturing an electrocatalyst comprising: preparing a first reversed micellar solution containing an aqueous solution of a noble metal ion; reducing the noble metal ion to a noble metal by adding a reducing agent to the first reversed micellar solution; preparing a second reversed micellar solution containing an aqueous solution of a transition metal ion; preparing a transition metal from the transition metal ion by adding a precipitant to the second reversed micellar solution; and loading a complex metal particle composed of the noble metal and the transition metal on a conductive support.

BRIEF DESCRIPTION OF THE DRAWINGS

The invention will now be described with reference to the accompanying drawings wherein;

FIG. 3 is a view for explaining a reaction in which noble metal particles are generated in a micelle;

FIGS. 11A and 11B are tables showing configurations of examples and comparative examples and measurement results thereof.

DETAILED DESCRIPTION OF THE PREFERRED EMBODIMENT

Hereinafter, description will be made of embodiments of the present invention with reference to the drawings.

An electrocatalyst of the present invention is an electrocatalyst composed by loading noble metal with a mean particle diameter of 1 to 10 nm on a surface of a conductive support. The noble metal is formed by adding a reducing agent for reducing noble metal ions to a reversed micellar solution containing an aqueous solution of the noble metal ions in a micelle.

In an electrode for a fuel cell, which is fabricated by a conventional method, a utilization of platinum in the electrocatalyst has been low. A reason for this is not clear, but carbon black to be used as an electrocatalyst support is one in which primary carbon particles with a diameter of approximately 10 to 50 nm form an aggregate structure, and further coagulates to form an agglomerate structure, and the carbon black has many nanometer-order fine pores in the agglomerate structure. It is conceived that, in the conventional catalyst loading method, many of catalyst particles with a diameter of 2 to 4 nm are loaded in such fine pores, resulting in the lowering of the utilization of the platinum in the catalyst.

Figure 1:
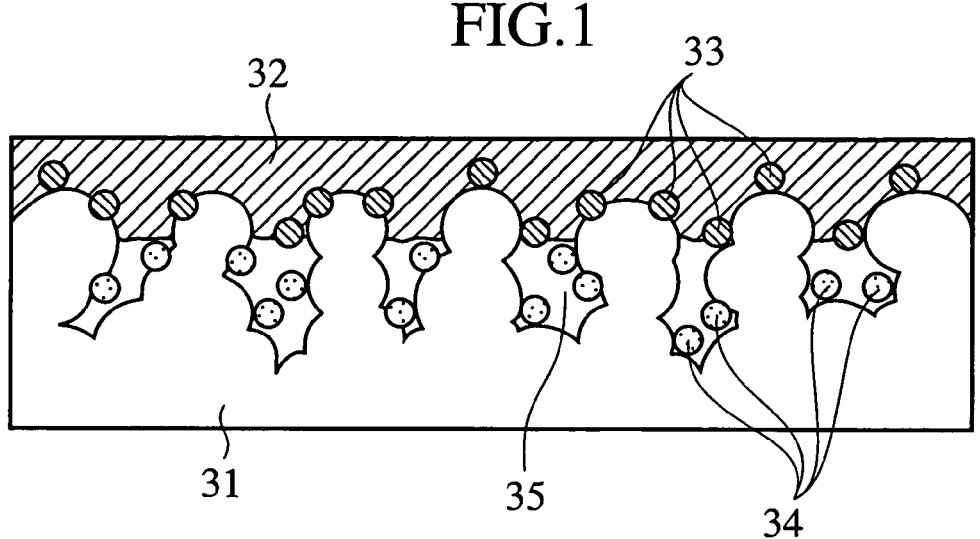
FIG. 1 is a schematic view showing an electrocatalyst of a fuel cell, which is fabricated by a conventional method.

FIG. 1 shows a contact state of a surface of catalyst particles-loaded carbon and a solid polymer electrolyte (ionomer) in a catalyst layer of a fuel cell electrode fabricated by the conventional method. In general, in a ionomer solution for use in fabricating the electrode for the fuel cell, the ionomer is not completely dissolved in a solvent, but ionomer is dispersed in a colloidal state into the solution. In this case, a size and mode of presence of the ionomer are different depending on a type of the solvent and concentration of the ionomer. As shown in FIG. 1, when the size of the ionomer 32 in the solution is larger than a pore diameter of a carbon support 31, the ionomer 32 cannot enter the fine pores. Accordingly, though the catalyst particles are present in the fine pores 35 of the carbon support 31, a three-phase boundary that is a structure effective in an electrochemical reaction is not formed. Specifically, catalyst particles used in the electrochemical reaction are only catalyst particles 33 in contact with the ionomer 32, and catalyst particles 34 that are not in contact with the ionomer 32 are not used for the electrochemical reaction. Therefore, in the conventional electrode for the fuel cell, the utilization of the catalyst is lowered, and thus a high activity electrode cannot be obtained.

In order to enhance the utilization of the catalyst to improve reaction efficiency thereof, there is a method of utilizing a carbon support that does not have the small fine pores allowing the ionomer to enter the same. However, a specific surface area of such a carbon support is small, and accordingly, when a loaded amount of the catalyst is increased, the catalyst particles overlap one another to lower dispersibility thereof, and high activity cannot be obtained. Moreover, there is also a method of, instead of mixing the ionomer to the electrode, using an ionomer having proton conductivity. However, unless the ionomer enters the fine pores of the carbon support, the utilization of the catalyst cannot be enhanced. Furthermore, a method of reducing the size of the ionomer so that the ionomer can enter the nanometer-order fine pores is conceived. However, limitations are imposed on a polymerization degree of the ionomer for use, the solvent, and concentrations of ionomer. Therefore, even by such methods, the size of the ionomer cannot be reduced sufficiently enough to allow the ionomer to freely enter the nanometer-order carbon fine particles.

However, according to the present invention, use of a reversed micelle method makes it possible to adjust a size of metal particles precipitated, thus making it possible to prepare catalyst particles made more finely. In addition, use of a reversed micellar solution makes it possible to load the catalyst particles on a surface of the support at an approximately equal interval.

Figure 2:
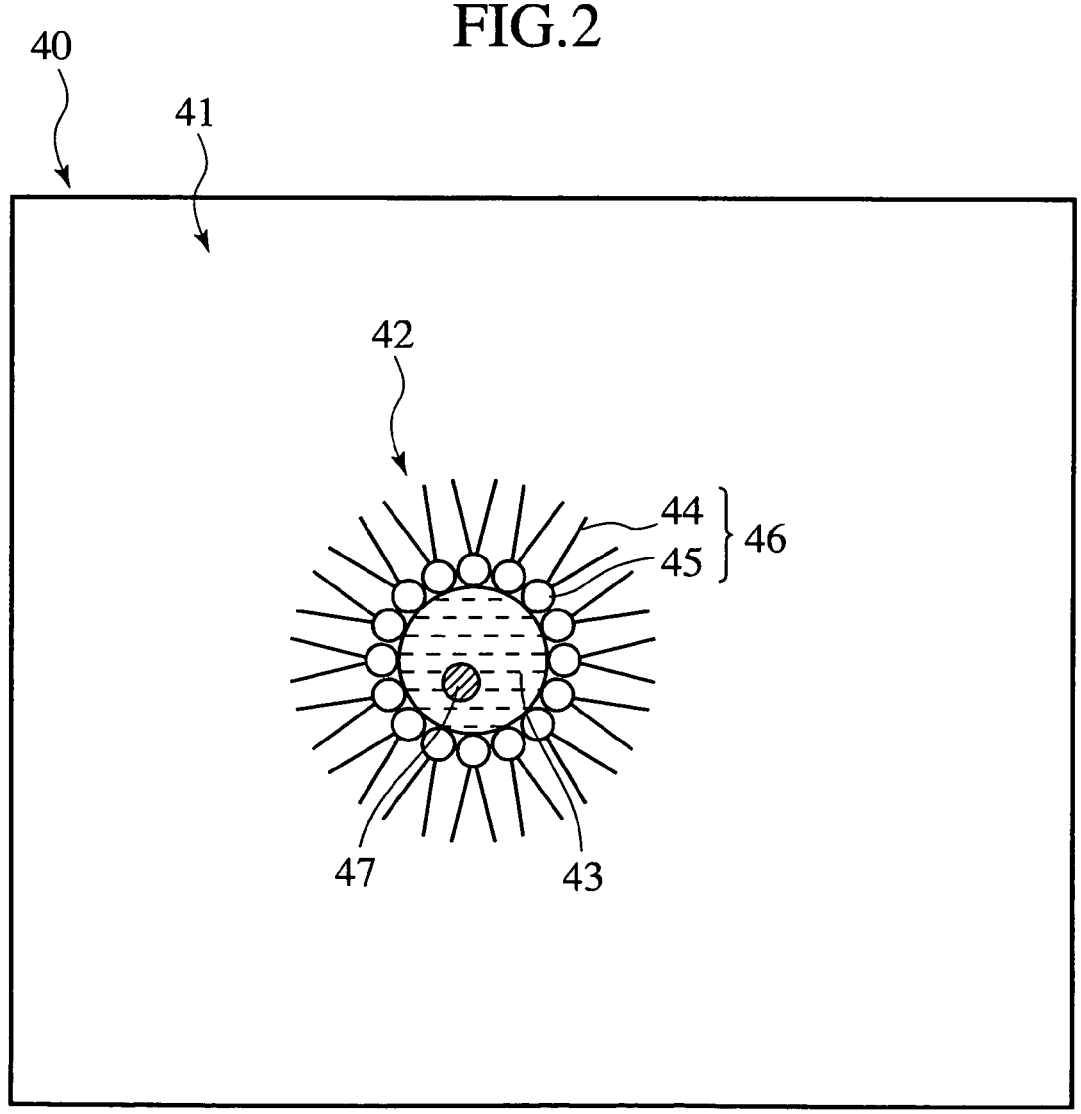
FIG. 2 is a schematic view for explaining a reversed micellar solution.

The "reversed micellar solution" for use in the present invention will be described in detail. As shown in FIG. 2, the "reversed micellar solution" is a solution composed of an organic solvent 41, an aqueous solution 43 containing noble metal ions and the like, and amphiphiles 46 such as a surfactant. In the reversed micellar solution 40, the aqueous solution 43 and the amphiphiles 46 aggregate in the organic solvent 41 to form a micelle 42, and in the micelle 42, the aqueous solution 43 is present. In each of the amphiphiles 46, a hydrophobic group 44 is oriented, in an organic solvent phase, toward the outside, that is, an organic solvent phase side, and a hydrophilic group 45 is oriented to the inside, that is an aqueous solution phase side. An orientation of the hydrophobic group 44 and the hydrophilic group 45 is reversed to that in the case of an aqueous solvent, and accordingly, this solution is called the reversed micellar solution. Such a reversed micellar solution can be prepared by adding an aqueous solution to a solution in which the amphiphiles are dissolved into the organic solvent and agitating the obtained solution. A portion in which the hydrophilic groups aggregate has a capability of holding polar molecules such as those of water. The aqueous solution concerned is turned into extremely small droplets with a diameter of several nanometers to several ten nanometers, and stably dispersed into the organic solvent. A size of the droplets can be controlled by a molar ratio of the injected water and the surfactant.

When a reducing agent which reduces the noble metal ions is added to the reversed micellar solution 40 containing the noble metal ion solution 43 in the micelle 42, the noble metal ions are reduced to noble metal in the micelle 42, and turned into a colloidal noble metal particle 47. The reducing agent may be added as an aqueous solution, or may be added as the reversed micellar solution containing the reducing agent in the micelle. This will be described specifically with reference to FIG. 3. FIG. 3 shows a case of adding the reducing agent as the reversed micellar solution. First, a surfactant 2 is mixed to the organic solvent, and the noble metal ion solution is added to the mixture. Then, a micelle 5 having hydrophilic groups 3 in the inside and hydrophobic groups 4 on the outside is formed, and the noble metal ion solution is contained in the micelle 5 (reversed micellar solution A). When a reducing agent solution is used instead of the noble metal ion solution, a micelle 6 containing the reducing agent solution therein is prepared (reversed micellar solution B). When these reversed micellar solutions A and B are mixed together, the reversed micelles are coupled to each other, and a reduction reaction proceeds in a micelle 7 (reversed micellar solution C). Furthermore, when a reduced particle 7a is matured, a micelle 8 containing colloidal noble metal controlled by a size of the micelle can be obtained (reversed micellar solution D). Note that two types or more of the noble metal ions may be contained in the noble metal ion solution in the micelle 5. The inside of the micelle is excellent in dispersibility, and there, ultra-fine noble metal particles 8a having an extremely uniform composition even in the case where the two types or more of noble metal ions are contained therein is obtained.

The noble metal ion in the present invention is an ion of at least one noble metal selected from the group consisting of platinum (Pt), palladium (Pd), rhodium (Rh), osmium (Os), ruthenium (Ru) and iridium (Ir). Among them, it is preferable to use platinum and palladium. This is because these metals are excellent in catalyst activity when these are used for the electrocatalyst.

In the present invention, the reducing agent is one capable of converting the noble metal ions in the micelle into the noble metal particles, and can be selected appropriately according to the noble metal for use. As the reducing agent, hydrogen, hydrazine, sodium tetrahydroborate and the like, which react with the noble metal to generate the noble metal particle in the micelle, can be given.

The mean particle diameter of the noble metal loaded on the electrocatalyst of the present invention is within a range from 1 to 10 nm, and preferably, 2 to 5 nm. If the mean particle diameter is within this range, a surface area sufficient for the catalyst activity can be ensured, and an amount of active catalyst per unit mass of the noble metal can be increased. Note that the mean particle diameter of the catalyst metal in the present invention can be calculated by a mean value of crystallite diameters obtained from half widths of diffraction peaks of the catalyst metal in X-ray diffraction and by a mean value of particle diameters of the catalyst metal, which are measured by a transmission electron microscope.

It is preferable that the conductive support be carbon particles with a BET specific surface area ranging from 80 $m^2/g$ to 2000 $m^2/g$. For graphitized carbon particles, ones with a BET specific surface area ranging from 80 $m^2/g$ to 600 $m^2/g$ are preferable. For ungraphitized carbon particles, ones with a BET specific surface area ranging from 250 $m^2/g$ to 1600 $m^2/g$ are preferable. If the BET specific surface areas are in the above-described ranges, the catalyst component can be highly dispersed on the carbon support. Moreover, the carbon particles are highly dispersed in the organic solvent, and accordingly, the micelle can be easily attached onto the surface of each carbon particle in the reversed micellar solution, which is also advantageous.

The electrocatalyst of the present invention may be one in which, besides the above-described noble metal particles, transition metal particles are further loaded on the conductive support. Use of complex metal of the noble metal and transition metal makes it possible to further improve the catalyst activity. Particularly, the use of the transition metal is advantageous in a point of improvement of mass activity (activity of noble metal per unit weight).

Figure 4:
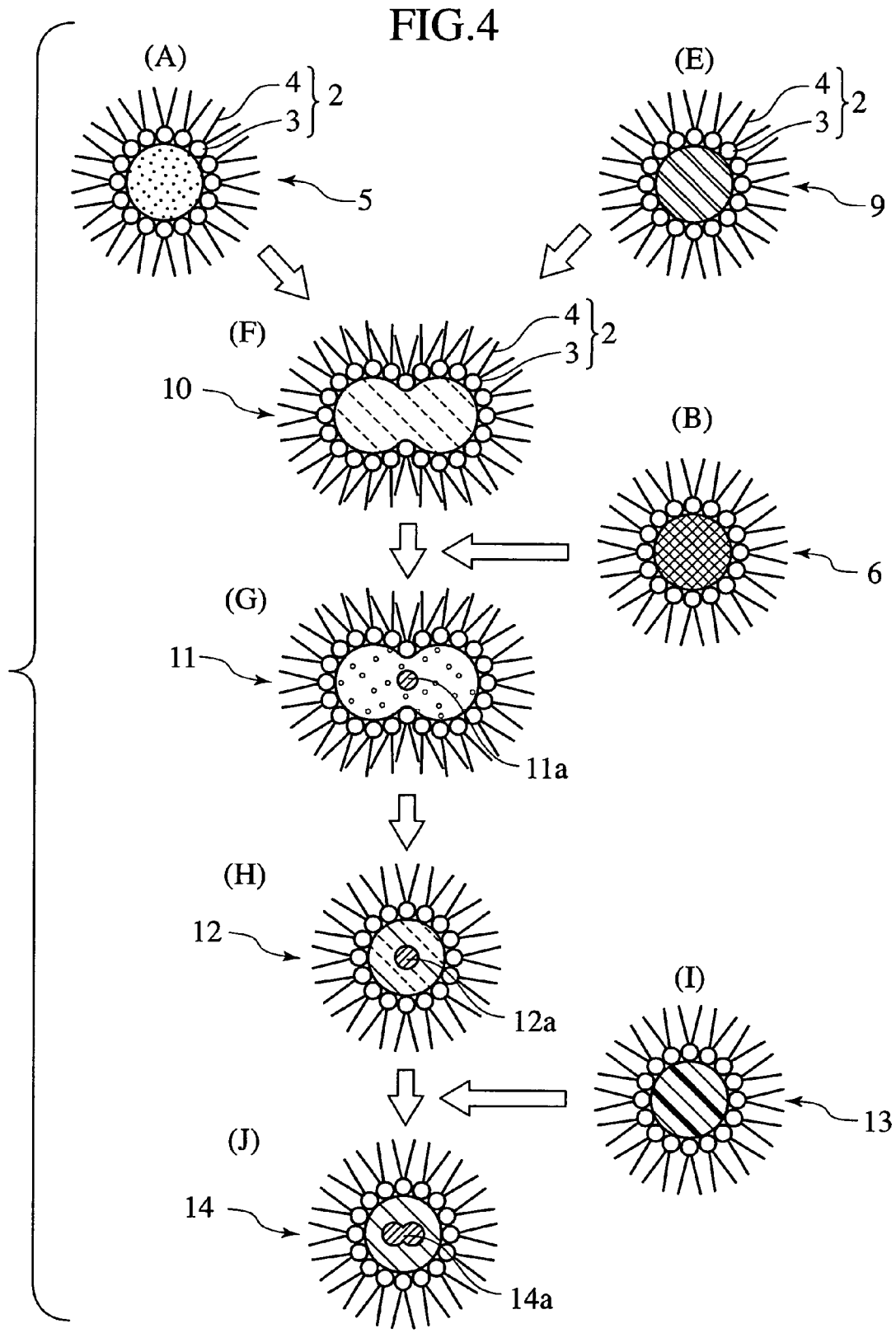
FIG. 4 is a view showing a reaction in which a complex metal particle is generated from a reversed micellar solution containing a noble metal ion solution and from a reversed micellar solution containing a transition metal ion solution.

A method of manufacturing complex metal particles composed of the noble metal and the transition metal, which are loaded on the conductive support; will be described in detail with reference to FIG. 4. In FIG. 4, (A) indicates a reversed micellar solution containing a noble metal ion solution in the micelle, and (E) indicates a reversed micellar solution containing a transition metal ion solution in the micelle. When the reversed micellar solutions A and E are mixed together, micelles 5 and 9 are coupled to each other, and a micelle 10 in a state where the noble metal ion and the transition metal ion are uniformly present can be obtained (reversed micellar solution F). To the reversed micellar solution F, the reversed micellar solution B containing the reducing agent solution in the micelle 6 is added. Then, the micelles 6 and 10 are coupled to each other to create a micelle 11. A reduction reaction proceeds in the micelle 11 (reversed micellar solution G). Furthermore, when reduced particles 11a are matured, a micelle 12 containing noble metal particles 12a can be obtained (reversed micellar solution H). To the micelle 12, a reversed micellar solution I containing an aqueous solution of a precipitant in a micelle 13 is added. Then, the micelles 12 and 13 are coupled to each other to create a micelle 14. In the micelle 14, a precipitation reaction proceeds. Furthermore, when a precipitate is matured, the micelle 14 containing a complex metal particle 14a of the noble metal particle and transition metal particle, which are controlled by the sizes of the micelle, can be obtained (reversed micellar solution J). According to the method concerned, even in the case of the complex metal particle of the noble metal and transition metal, the mean particle diameter can be controlled within a range of 1 to 10 nm, and preferably, 2 to 7 nm, and thus, an electrocatalyst including complex metal particles dispersed uniformly on the surface of the support can be obtained.

Note that it is not necessary to add the reducing agent and the precipitant in the form of the reversed micellar solutions as shown in FIG. 4, and aqueous solutions thereof may be directly added.

As the transition metal for use in the electrocatalyst of the present invention, it is preferable to use at least one selected from the group consisting of vanadium (V), chromium (Cr), manganese (Mn), iron (Fe), cobalt (Co), nickel (Ni), copper (Cu) and zinc (Zn). Aqueous sulfate solutions, aqueous ammonium salt solutions and aqueous halogenated compound solutions of these are usable.

In the present invention, the precipitant implies one capable of converting the transition metal ions in the micelle into the precipitate, and can be selected appropriately in accordance with the transition metal to be used. As the precipitant, ammonia, aqueous ammonium salt, tetramethylammonium hydroxide, aqueous solution of alkaline and alkaline-earth metal compounds, and the like, which react with the transition metal ion and generate the precipitate in the micelle, are usable.

Figure 5A:
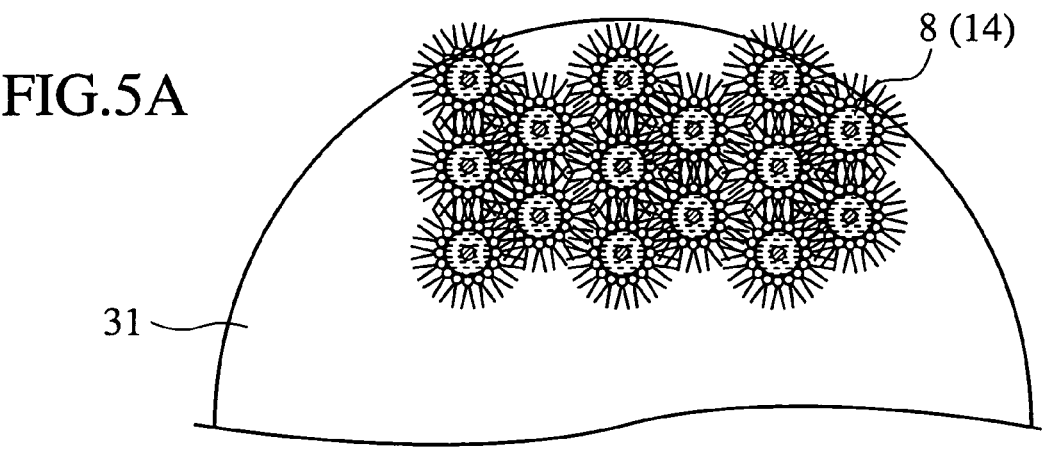
FIGS. 5A and 5B are views showing a mode in which the reversed micellar solution is attached onto a carbon support.
Figure 5B:
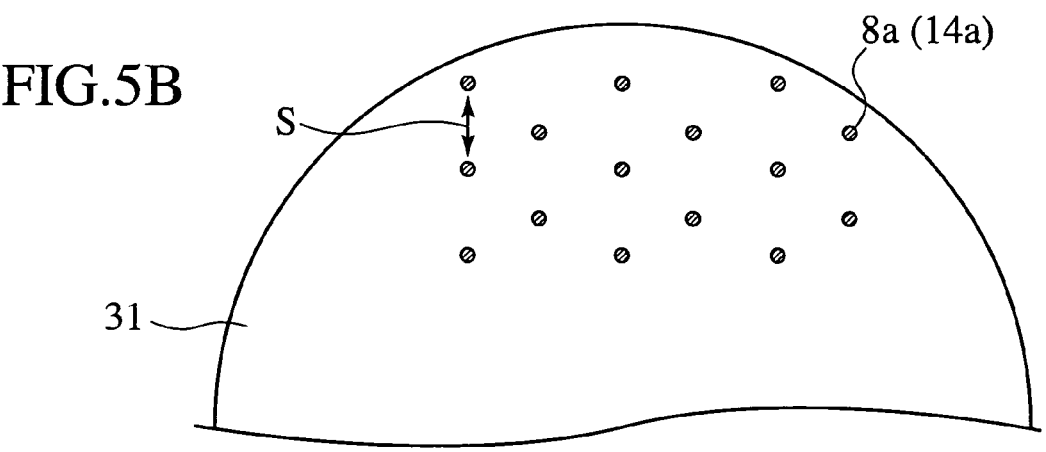

In the present invention, while the noble metal ion-containing solution is the reversed micellar solution, the size of the micelle can be adjusted according to the types and added amounts of the solvents and surfactants to be used. When the reversed micellar solution with a diameter of the micelle set in a range from 20 to 100 nm is added with the carbon support as, as shown in FIG. 5A, the micelles 8 (14) are attached uniformly onto the surface of the carbon support 31 concerned. When the support 31 is calcinated, as shown in FIG. 5B, an electrocatalyst can be obtained, in which the metal particles 8a (14a) are loaded uniformly on the surface of the support 31 at an interval S of 10 to 50 nm between the metal particles 8a (14a) adjacent to one another. In the conventional method, platinum and a platinum alloy have coagulated, making it difficult to control the particle diameter and a particle distribution. According to the present invention, it is possible to control such diameter and distribution extremely simply and securely.

Figure 6:
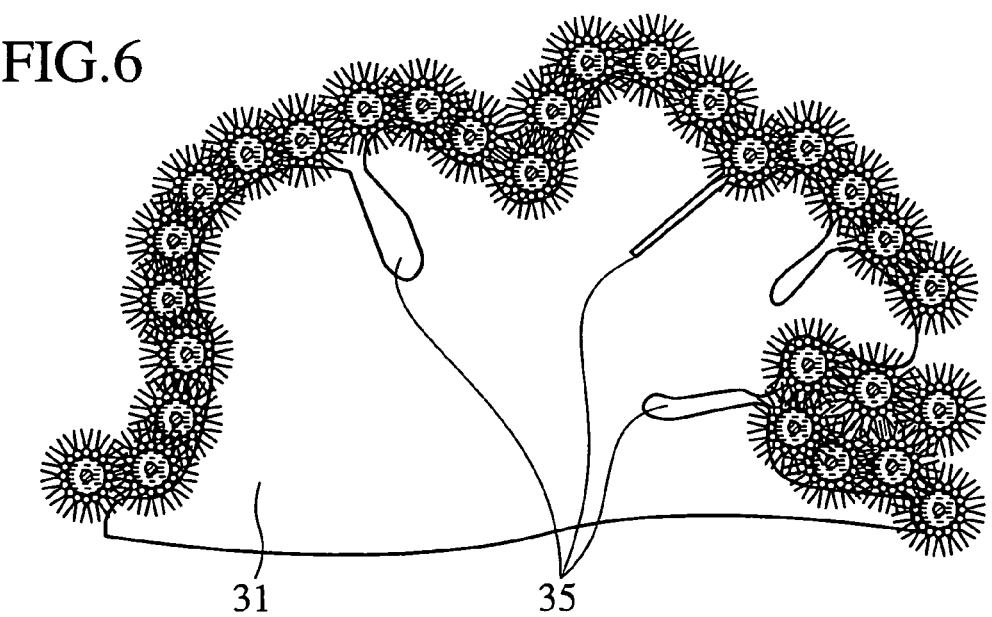
FIG. 6 is a schematic view showing a mode in which the reversed micellar solution cannot enter fine pores.

Moreover, when the preparation is performed in such a manner, as shown in FIG. 6, the micelles 8 (14) cannot enter the fine pores 35, of which opening diameter is less than 10 nm. Therefore, the metal particles 8a (14a) are highly dispersed only on the surface of the support 31, thus improving the effective utilization of the metal particles. Heretofore, the particles in the fine pores of the support have been inferior in a contact state with the electrolyte, bringing a lowering of the property of the three-phase boundary. According to the present invention, a ratio of an amount of the noble metal loaded on the surface of the support to an amount of the noble metal loaded in the pores of the support becomes 2:1 to 9:1. This shows that the ratio of the amount of the metal on the surface is increased as compared with a conventional ratio that is 1:9 to 2:1.

Note that, in the electrocatalyst of the present invention, a ratio of the amount of metal loaded on the conductive support per electrocatalyst is within a range of 5 to 70% by mass, and preferably, 10 to 50% by mass. Note that the amount of metal implies a total amount of the noble metal and the transition metal. If the ratio of the amount of metal to the electrocatalyst is less than 5% by mass, sufficient activity and durability cannot be obtained. Meanwhile, if the ratio exceeds 70% by mass, the metal particles are difficult to disperse uniformly, and high dispersion loading of the catalyst particles becomes difficult.

The method of manufacturing the electrocatalyst of the present invention will be described in far more detail.

Figure 7:
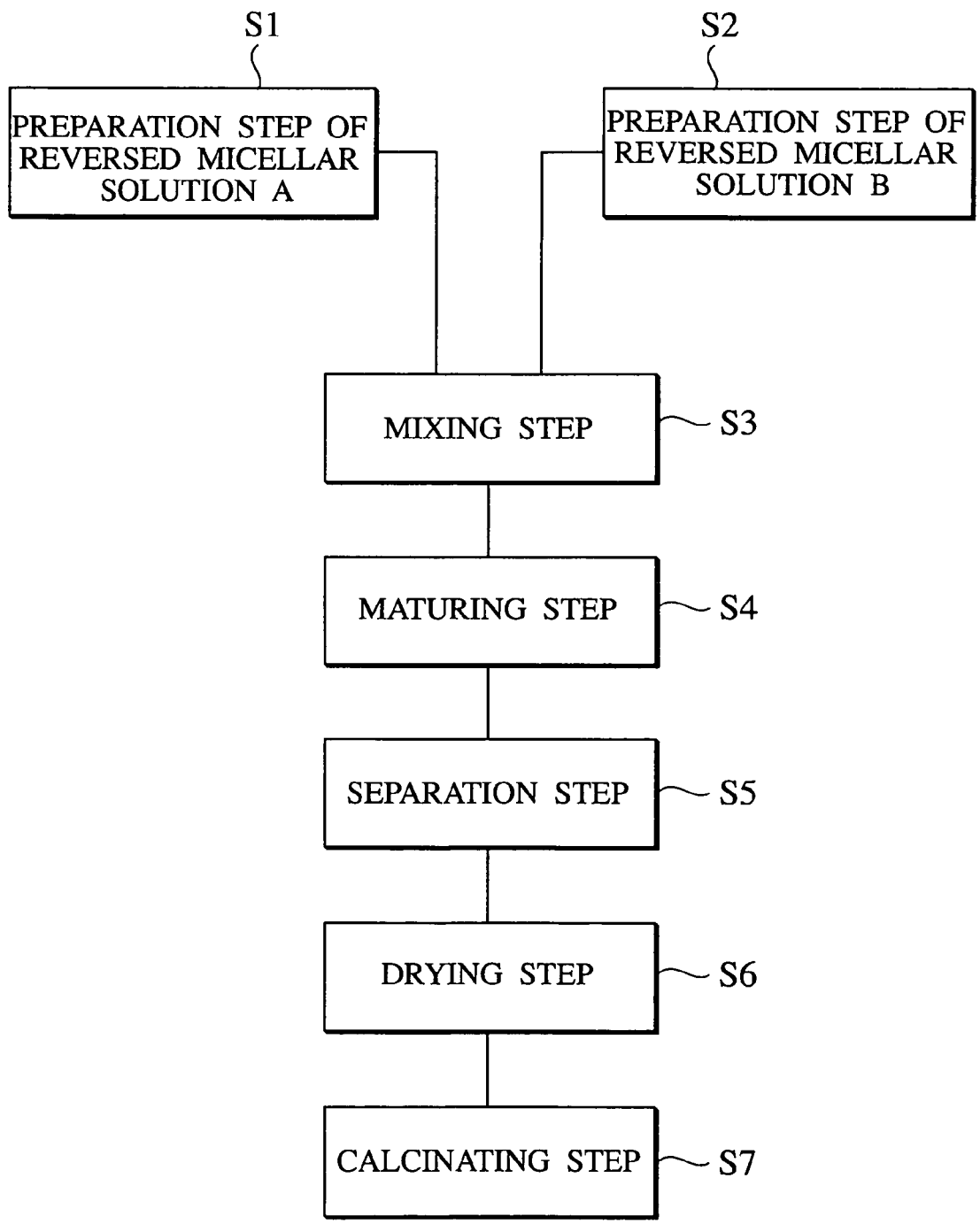
FIG. 7 is a flowchart of a method of manufacturing the electrocatalyst of the present invention.

The method of manufacturing the electrocatalyst of the present invention is characterized in that the sizes of the noble metal particles and/or other metal particles are controlled by use of the reversed micellar solution. Specifically, onto the surface of the carbon support, the noble metal particles and/or the other metal particles are uniformly attached by use of the reversed micellar solution. Subsequently, the support is filtered, and then calcinated under an atmosphere of inert gas, and thus the electrocatalyst in which the catalyst activity is large is obtained. The method of manufacturing the electrocatalyst of the present invention will be described with reference to FIG. 7.

In a preparation step S1 of the reversed micellar solution A, the surfactant is added into the organic solvent, the noble metal ion solution is further added thereto, and the mixture is stirred. Thus, the reversed micellar solution A is prepared. In a similar way, in a preparation step S2 of the reversed micellar solution B, the aqueous solution of the reducing agent which reduces the above-described noble metal ions to the noble metal is added into the organic solvent mixed with the surfactant. Thus, the reversed micellar solution B is prepared.

Subsequently in a mixing step S3, the reversed micellar solution B is added to the reversed micellar solution A, and the mixture is stirred. Then, the reversed micellar solution C containing a colloid of the noble metal in the reversed micelles is generated. After the solution C is matured in a maturing step S4, the precipitate is filtered and rinsed by methods such as centrifugal separation, filtering and washing/rising in a separation step S6. Furthermore, the precipitate is dried in a drying step S6, followed by pulverization, and thus a precursor of the electrocatalyst is obtained. Then, the precursor is calcinated in a calcinating step S7. By the above-described steps S1 to S7, the electrocatalyst of the present invention can be obtained. Note that, as compared with methods of calcinating metal salt and a certain kind of organic salt, the above-described calcinating step can be performed at low temperature. In addition, when the support is the carbon particles, it is preferable that the drying and the calcinating be performed under an inert atmosphere such as argon gas, nitrogen gas and the like so that oxidation of the carbon cannot proceed.

Note that, as described above, in the present invention, the micelle solution E containing the transition metal ion solution in the micelle is further mixed to the reversed micellar solution A, and thus the electrocatalyst can also be manufactured. In order to precipitate the metal ions contained in the reversed micellar solution E, it is satisfactory if the aqueous solution of the precipitant or the reversed micellar solution of the precipitant solution is added thereto.

For the organic solvent usable for forming the reversed micelle, a variety of solvents are usable. As examples of the organic solvent, there are cyclohexane, methylcyclohexane, cycloheptane, heptanol, octanol, dodecyl alcohol, cetyl alcohol, i-octane, n-heptane, n-hexane, n-decane, benzene, toluene, xylene, and the like. Moreover, for the purpose of adjusting the size of the droplets in the reversed micellar solution, alcohol and the like may be added. Two types or more of the organic solvents may be used in combination as well as a single type thereof is used. Moreover, the organic solvent can be used for preparing both of the reversed micellar solutions A and B. Furthermore, in the case of supplying the reversed micellar solution as the reducing agent and the precipitant, the organic solvent can be used also for preparing these solutions. In this case, the organic solvent for use in one reversed micellar solution and the organic solvent for use in the other reversed micellar solution may be ones of either the same type or different types.

What can be given as the surfactant forming the reversed micellar solution is polyoxyethylene nonylphenyl ether, magnesium laurate, zinc caprate, zinc myristate, sodium phenylstearate, aluminum dicaprylate, tetraisoamylammonium thiocyanate, tri-n-butyl-n-octadecylammonium formate, n-amyltri-n-butylammonium iodide, sodium bis(2-ethylhexyl)succinate, sodium dinonylnaphthalenesulfonate, calcium cetylsulfate, dodecylamine oleate, dodecylamine propionate, cetyltrimethylammonium bromide, stearyltrimethylammonium bromide, cetyltrimethylammonium chloride, stearyltrimethylammonium chloride, dodecyltrimethylammonium bromide, octadecyltrimethylammonium bromide, dodecyltrimethylammonium chloride, octadecyltrimethylammonium chloride, didodecyldimethylammonium bromide, ditetradecyldimethylammonium bromide, ditetradecyldimethylammonium chloride, (2-octyloxy-1-octyloxymethyl)polyoxyethylene ethyl ether, and the like. The surfactant can also be used for preparing both of the reversed micellar solutions, and two types or more thereof can be used in combination. Note that an added amount of the surfactant to the organic solvent is 10 to 300 mass parts with respect to 100 mass parts of the organic solvent. When the added amount is lowered than 10 mass parts, it becomes difficult to form the reversed micelle. Meanwhile, when the added amount exceeds 300 mass parts, a rod-shaped micelle is formed, and it becomes difficult to control the particle diameter of the noble metal to a specific size.

As described above, the noble metal is at least one selected from the group consisting of platinum, palladium, rhodium, osmium, ruthenium and iridium. Supply sources of the ions of these noble metals are not particularly limited, and compounds containing these ions can be widely used. As examples of such compounds, there can be given inorganic salts such as nitrate, sulfate, ammonium salt, amine, carbonate, bicarbonate, halide, and nitrite, carboxylate such as formate and oxalate, hydroxide, alkoxide, oxide, and the like, which are of the above-described noble metals. The compounds can be selected appropriately in accordance with types and pHs of solvents dissolving the compounds therein. Among them, the nitrate, carbonate, oxide, hydroxide and the like of the noble metals are preferable for industrial use. Noble metal concentration in the aqueous solution containing the noble metal ions in the micelle is preferably 0.1 to 50% by mass, and more preferably, 0.5 to 20% by mass in terms of metal.

Moreover, as described above, as the reducing agent, there can be given hydrogen, hydrazine, sodium thiosulfate, citric acid, sodium citrate, L-ascorbic acid, sodium borohydride, formaldehyde, methanol, ethanol, ethylene, carbon monoxide, and the like. One that can be prepared as an aqueous solution, such as hydrazine, may be directly added to the reversed micellar solution while adjusting concentration thereof at 0.1 to 40% by mass, or a reversed micellar solution may be prepared by use of the solution and added to the reversed micellar solution A. When the solution has the concentration of 0.1 to 40% by mass, even if the noble metal ions are turned into the noble metal particle in the micelle, the noble metal can be dispersed in a colloidal state in the micelle. Note that a powder substance such as sodium borohydride can be supplied as it is. A gaseous substance at normal temperature such as hydrogen can also be supplied by bubbling.

As the transition metal ions, as described above, at least one or more transition metal ions selected from the group consisting of the group of ions of vanadium, chromium, manganese, iron, cobalt, nickel, copper and zinc are given. As examples of substances which form these ions, there can be given inorganic salts such as nitrate, sulfate, ammonium salt, amine, carbonate, bicarbonate, halide, and nitrite, carboxylate such as formate and oxalate, hydride, alkoxide, oxide, and the like, which are of the above-described noble metals. The compounds can be selected appropriately in accordance with types and pHs of solvents dissolving the compounds therein.

As the precipitant, as described above, ammonia, ammonia water, tetramethylammonium hydroxide and the like can be given. With regard to the ammonia water, the tetramethylammonium hydroxide or the like, an aqueous solution thereof may be directly added to the reversed micellar solution while adjusting concentration of the solution at 0.1 to 30% by mass, or a reversed micellar solution may be prepared by use of the solution and added to the reversed micellar solution. Note that, when the solution has the concentration of 0.1 to 30% by mass, even if the transition metal ions are turned into the transition metal particles in the micelle, the transition metal can be dispersed in a colloidal state in the micelle.

As the conductive support usable in the present invention, as described above, the carbon particles are preferable. Particularly, carbon black particles with a BET specific surface area ranging from 80 to 2000 $m^2/g$, and preferably, 250 to 1600 $m^2/g$, can be given. As long as the BET specific surface area is within the above-described range, the carbon black may be furnace black, lamp black, acetylene black, channel black, thermal black, or the like. Moreover, ones called carbon nanohorn, carbon nanotube, carbon fiber and the like can also be used. Particularly, what is also preferably usable is Kentjenblack with a BET specific surface area Tanging from 700 to 1400 $m^2/g$, Vulcan with a BET specific surface area ranging from 200 to 600 $m^2/g$, graphitized Kentjenblack with a BET specific surface area ranging from 100 to 600 $m^2/g$, which is partially graphitized at high temperature, and graphitized Vulcan and graphitized furnace black with BET specific surface areas ranging from 80 to 200 $m^2/g$. Furthermore, in order to uniformly disperse the noble metal particles and to adjust, to a preferred state, a contact state of the carbon surface loading the noble metal particles thereon and the ionomer, it is preferable that, with regard to the particle diameter of the carbon particles, a size of primary particles be 30 to 100 nm. However, the primary particles may coagulate to form particles with a size of 0.1 to 1 μm. Note that it is more preferable that the carbon particles be one, in which attachments on the surface of the support is cleaned by an alkaline solution such as a sodium hydroxide solution, a potassium hydroxide solution and a calcium hydroxide solution, and oil attached and impurities mixed in the manufacturing process is removed.

Figure 8:
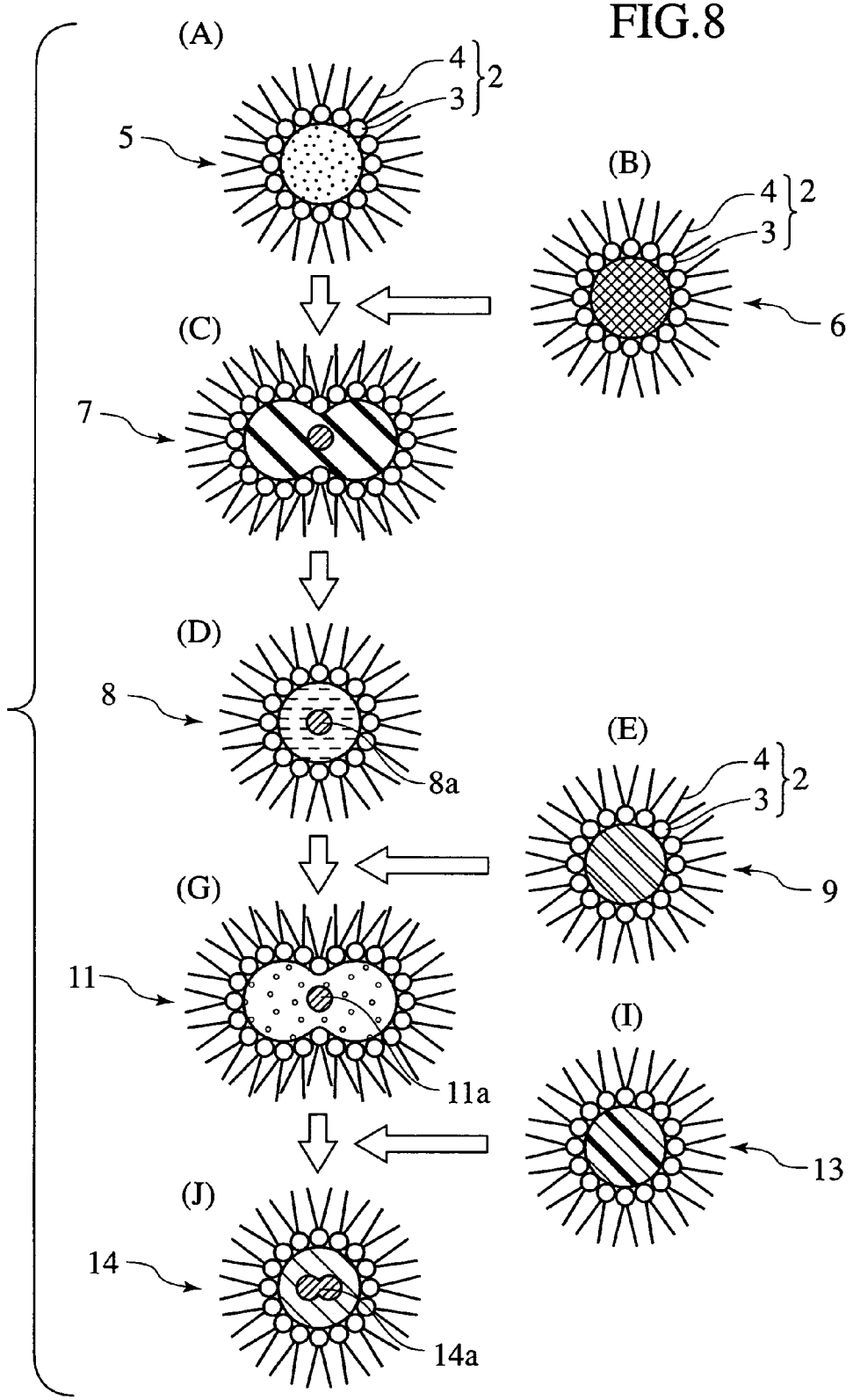
FIGS. 8, 9 and 10 are views showing another reaction in which the complex metal particle is generated from the reversed micellar solution containing the noble metal ion solution and from the reversed micellar solution containing the transition metal ion solution.
Figure 9:
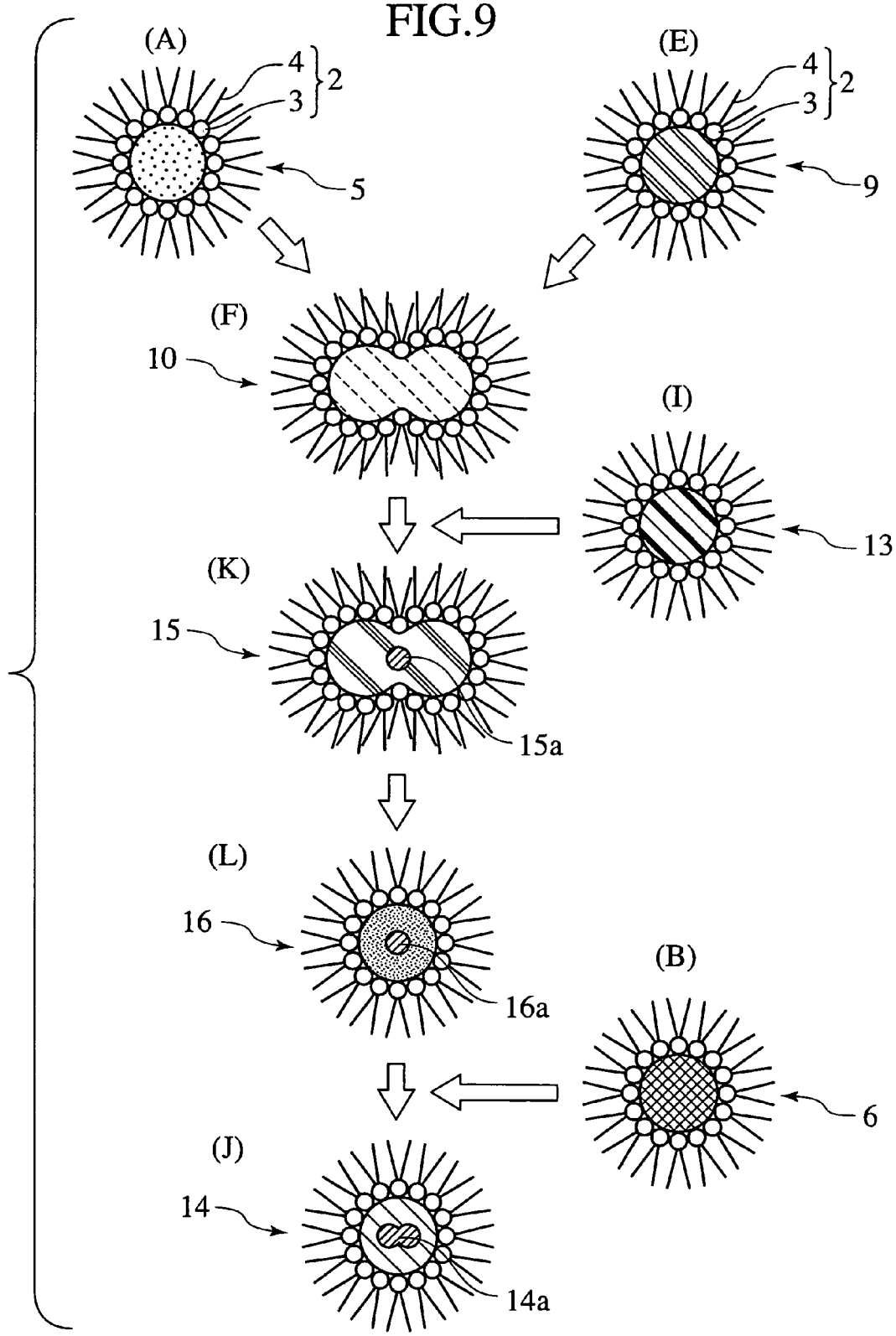
Figure 10:
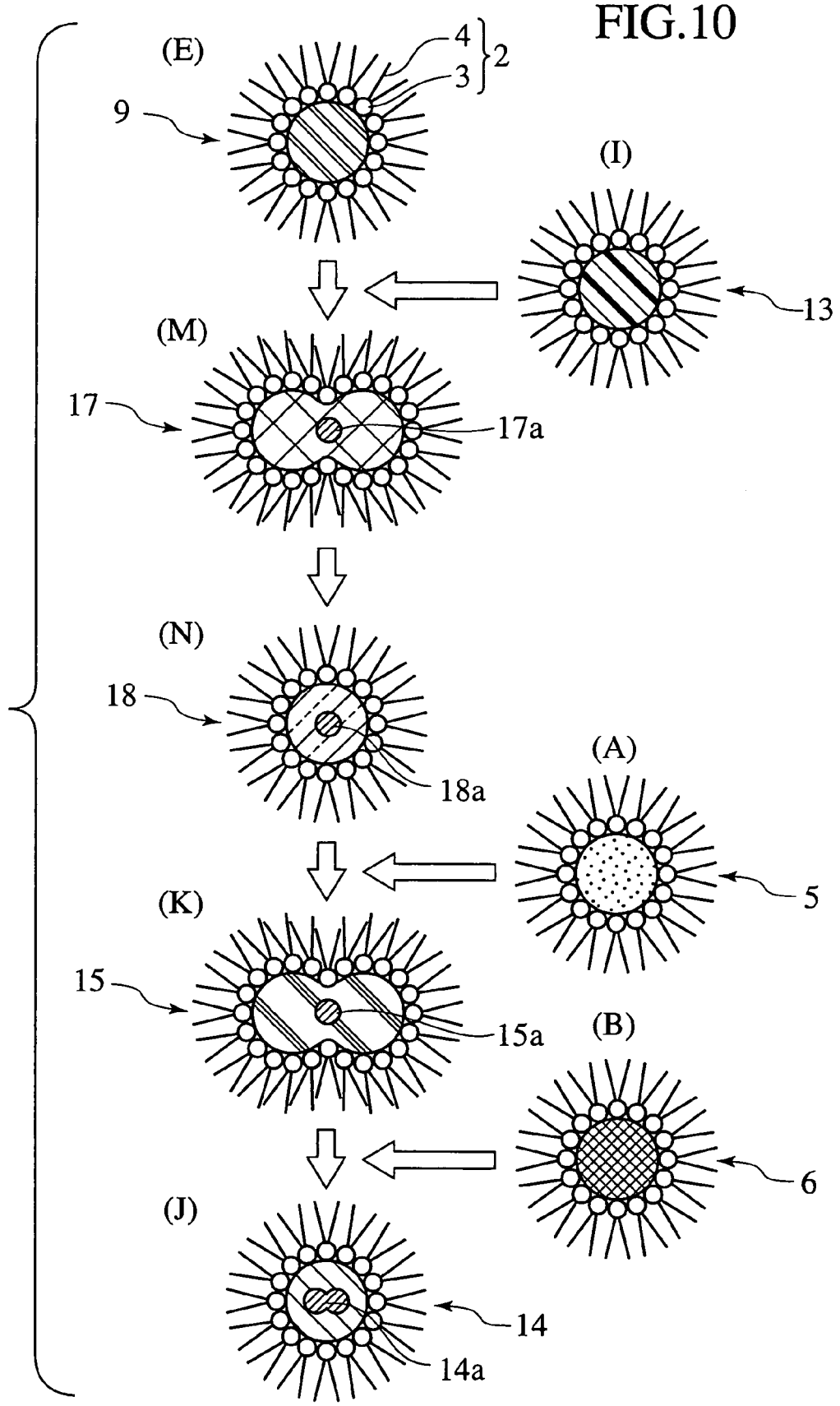

When the reducing agent is added to the reversed micellar solution A, the noble metal ions are turned into the noble metal particles, and when the reversed micellar solution E is added to the precipitant, the transition metal ions are turned into the transition metal particles. Therefore, as an addition order of the reversed micellar solution A, reversed micellar solution E, reducing agent and precipitant, the following (i) to (iv) can be given. (i) To the reversed micellar solution A, the reducing agent or the reversed micellar solution B containing the reducing agent is added, the reversed micellar solution E is added to the mixture, and then, the precipitant or the reversed micellar solution I containing the precipitant is added (refer to FIG. 8). (ii) To a mixed solution of the reversed micellar solution A and reversed micellar solution E, the reducing agent or the reversed micellar solution B containing the reducing agent is first added, and then, the precipitant or the reversed micellar solution I containing the precipitant is added (refer to FIG. 4). (iii) To a mixed solution of the reversed micellar solution A and reversed micellar solution E, the precipitant or the reversed micellar solution I containing the precipitant is first added, and then, the reducing agent or the reversed micellar solution B containing the reducing agent is added (refer to FIG. 9). (iv) To the reversed micellar solution E, the precipitant or the reversed micellar solution I containing the precipitant is added, the reversed micellar solution A is added to the mixture, and then, the reducing agent or the reversed micellar solution B containing the reducing agent is further added. In this case, when the conductive support is added to the solutions obtained through the above-described steps (i) to (iv), the complex metal particles composed of the noble metal and the transition metal are attached onto the surface of the support. Note that, in FIG. 9, (K) indicates a reversed micellar solution containing a precipitated particle 15a and the noble metal ion solution in a micelle 15, and (L) indicates a reversed micellar solution containing a transition metal particle 16a and the noble metal ion solution in a micelle 16. Moreover, in FIG. 10, (M) indicates a reversed micellar solution containing a precipitated particle 17a in a micelle 17, and (N) indicates a reversed micellar solution containing a transition metal particle 18a in a micelle 18.

However, the present invention is not limited to such modes as described above, and the conductive support may be added in any step prior to the described steps. Preferably, the conductive support is added to the reversed micellar solution A, both are mixed to form a uniform solution, and the above-described solutions and the like are sequentially added thereto. When the support is added to the reversed micellar solution A, the micelles containing the noble metal ion solution therein are uniformly attached onto the surface of the support, and the reducing agent is added thereto in this state. Accordingly, the noble metal particles can be loaded on the surface of the support while dispersibility thereof being maintained. As specific orders, the following (v) to (vii) can be given. (v) The conductive support is added to the reversed micellar solution A, and thereafter, the reducing agent or the reversed micellar solution B containing the reducing agent is added. Then, the reversed micellar solution B is added to the mixture, and subsequently, the precipitant or the reversed micellar solution I containing the precipitant is added. (vi) The conductive support is added to the reversed micellar solution A, and thereafter, the reversed micellar solution E is added. Then, the reducing agent or the reversed micellar solution B containing the reducing agent is added to the mixture, and subsequently, the precipitant or the reversed micellar solution I containing the precipitant is added, (vii) The conductive support is added to the reversed micellar solution A, and thereafter, the reversed micellar solution B is added. Then, the precipitant or the reversed micellar solution I containing the precipitant is added to the mixture, and subsequently, the reducing agent or the reversed micellar solution B containing the reducing agent is added. Moreover, after the support is added to the reversed micellar solution A, alcohols such as methanol and ethanol may be added thereto to break the micelles, thus making it possible to accelerate the loading of the noble metal particles onto the surface of the support.

Furthermore, a method may also be used, in which the conductive support is added to the reversed micellar solution E, both are mixed to form a uniform solution, and the above-described solutions and the like are sequentially added thereto. Specifically, the following method can be given. (viii) The conductive support is added to the reversed micellar solution E, and thereafter, the precipitant or the reversed micellar solution I containing the precipitant is added. Then, the reversed micellar solution A is added to the mixture, and subsequently, the reducing agent or the reversed micellar solution B containing the reducing agent is added.

In the present invention, after the metal particles are attached onto the surface of the support, the support is isolated from the solution, and the support is dried. As a drying method, for example, spontaneous drying, evaporation to dryness, drying by using a rotary evaporator, a spray dryer and a drum dryer, and the like can be used. It is satisfactory if a drying time is selected appropriately in accordance with a method to be used. According to cases, the support may be dried in the calcinating step without performing the drying step. It is satisfactory if the calcinating subsequently performed is performed at a temperature of 600 to 1100° C. for 30 to 180 minutes under an inert gas atmosphere.

Meanwhile, when the conductive support is the carbon particles, as the calcinating step, it is preferable to perform a step of performing the calcinating at 600 to 1100° C., and preferably, 630 to 830° C. under the inert gas atmosphere, followed by holding at 400 to 600° C., and preferably 500 to 600° C. As inert gas, argon, nitrogen, helium and the like are usable. In such a way, control can be performed so that the oxidation of the carbon cannot proceed.

In the electrocatalyst of the present invention, the noble metal particles with a mean particle diameter ranging from 1 to 10 nm can be highly dispersed on the surface of the carbon support. Accordingly, the area of the active surface effective in the electrode reaction is increased, and the catalyst is excellent in performance. Moreover, the metal particles are loaded on the surface of the support with the micelles interposed therebetween, and therefore, the interval among the metal particles can be set to 10 to 100 nm, and the contact efficiency of the catalyst particles and the ionomer can be set in a suitable state. Thus, the catalyst is far more excellent in performance.

The composition of the catalyst particle can be uniformed, and accordingly, the coagulation of the particles, which is accompanied with the alloying, is also restricted, and the dispersion state can be suitably maintained. Therefore, even after being subjected to the calcinating step under the inert gas atmosphere, the complex metal particles are loaded in a highly dispersed state without coagulating or sintering.

Moreover, the catalyst particles loaded in the fine pores with a diameter of 10 nm or less in the conductive catalyst can be decreased to a great extent. Accordingly, the noble metal particles and the complex metal particles, which are in sufficient contact with the electrolyte, are increased, thus making it also possible to decrease a usage amount of the noble metal to a great extent.

The electrocatalyst of the present invention is particularly suitable as an air-electrocatalyst. The electrocatalyst of the present invention accelerates growth of a Pt (111) crystal surface by loading the noble metal particles or the complex metal particles on the carbon particles in a highly dispersed state. Accordingly, the electrocatalyst can obtain high oxygen reduction activity.

In the conventional electrocatalyst, in a potential excited state where a potential is 0.7V or more in a strong acid electrolyte, the catalyst metal is apt to coagulate because the catalyst metal loaded on the surface of the support is isolated, and a gap occurs locally in the catalyst layer. Therefore, in some cases, the effective catalyst area is lowered, thus hindering the efficiency of the fuel cell. On the contrary, the electrocatalyst of the present invention can be adjusted to a particle diameter with which the catalyst is hard to dissolve even under such an environment. Therefore, the electrocatalyst of the present invention is excellent also in durability.

Furthermore, the method of manufacturing the electrocatalyst according to the present invention accelerates the crystal growth of the noble metal by means of the heat treatment, and further, solidly solves the transition metal to the noble metal, thus accelerating the alloying. Hence, a high activity electrocatalyst can be obtained. Moreover, for the method, it is easy to further include a step of oxidizing the metal particles, and an electrocatalyst can be formed, in which oxide films are formed on the surfaces of the noble metal particles and complex metal particles.

The present invention will be specifically described below based on examples. Note that the present invention is not solely limited to these examples.

EXAMPLE 1

The reversed micellar solution A was prepared in the following manner. As a surfactant, polyoxyethylene (5) nonylphenyl ether of 44 g was used. To the surfactant, cyclohexane was added to make up to 1.0 L (0.1 mol/L), and was stirred. To a mixture thereof, a platinum chloride solution of 13.2 g with a Pt concentration of 32% by mass was added, and was stirred for an hour until becoming transparent. Thus, the reversed micellar solution A was prepared.

The reversed micellar solution B was prepared in the following manner. As a surfactant, polyoxyethylene (5) nonylphenyl ether of 44 g was used. To the surfactant, cyclohexane was added to make up to 1.0 L (0.1 mol/L), and was stirred. To a mixture thereof, a hydrazine solution of 15 ml with a concentration of 0.5% by mass was added, and stirred for an hour. Thus, the reversed micellar solution B was prepared.

Subsequently, to the reversed micellar solution A, the reversed micellar solution B was mixed. Further, carbon black (Ketjenblack EC600JD made by Ketjenblack International Corporation) of 4.2 g with a BET specific surface area of 1270 $m^2/g$ was mixed thereto and stirred for an hour, and was then stirred and matured for 24 hours.

Thereafter, centrifugal separation was performed for the precipitate for six hours by use of a centrifugal machine (CENTRIFUGE05P-20B made by Hitachi, Ltd.). A precipitate was filtered, followed by washing and rising using ethanol and water. A solid material obtained was dried for 12 hours at 85° C. under decreased pressure, pulverized in a mortar, and calcinated for five hours at 600° C. under an argon atmosphere. Thus, an electrocatalyst was obtained. Note that the reversed micellar solutions in this example were added in the order shown in FIG. 3. A mean particle diameter of the noble metal and mass activity of the catalyst in the electrocatalyst obtained is shown in FIG. 11A.

EXAMPLE 2

In a similar way to that of Example 1, the reversed micellar solution A and the reversed micellar solution B were prepared.

The reversed micellar solution E was prepared in the following manner. As a surfactant, polyoxyethylene (5) nonylphenyl ether of 44 g was used. To the surfactant, cyclohexane was added to make up to 1.0 L (0.1 mol/L), and was stirred. To a mixture thereof, a cobalt nitrate ($Co(NO_3)_2 \cdot 6H_2O$) solution of 13.2 g with a cobalt nitrate concentration of 16% by mass was added, and was stirred for an hour until becoming transparent. Thus, the reversed micellar solution B was obtained.

The reversed micellar solution I was prepared in the following manner. As a surfactant, polyoxyethylene (5) nonylphenyl ether of 44 g was used. To the surfactant, cyclohexane was added to make up to 1.0 L (0.1 mol/L), and was stirred. To a mixture thereof, an ammonia solution of 13.2 g with a concentration of 5% by mass was added, and stirred for an hour. Thus, the reversed micellar solution I was prepared.

To the reversed micellar solution A, the reversed micellar solution B was mixed, and stirred for an hour. Thus, a solution containing platinum particles in the reversed micelles was obtained.

While agitating the mixed solution, the reversed micellar solution B was further added thereto and stirred for an hour, and then the reversed micellar solution I was added and stirred for an hour. Thus, a solution containing platinum particles and cobalt hydroxide in the reversed micelles was obtained Furthermore, after agitating the solution for an hour, carbon black (Ketjenblack EC600JD made by Ketjenblack International Corporation) of 4.2 g with a BET specific surface area of 1270 $m^2/g$ was mixed thereto and stirred for an hour, and was then stirred and matured for 24 hours.

Thereafter, centrifugal separation was performed for the precipitate for six hours by use of the centrifugal machine (CENTRIFUGE05P-20B made by Hitachi, Ltd.). A precipitate was filtered, followed by washing and rising using ethanol and water. A solid material obtained was dried for 12 hours at 85° C. under decreased pressure, pulverized in a mortar, and calcinated for five hours at 930° C. under an argon atmosphere, and further calcinated for five hours at 595° C. Thus, an electrocatalyst ($Pt_{0.75}Co_{0.25}$) was obtained. Note that the reversed micellar solutions in this example were added in the order shown in FIG. 8. A mean particle diameter of the noble metal and mass activity of the catalyst in the electrocatalyst obtained is shown in FIG. 11A.

EXAMPLE 3

In a similar way to those of Examples 1 and 2, the reversed micellar solution A, the reversed micellar solution B, the reversed micellar solution B and the reversed micellar solution I were prepared.

To the reversed micellar solution A, the reversed micellar solution I was mixed, and stirred for an hour.

While agitating the mixed solution, the reversed micellar solution B was added thereto and stirred for an hour, and then the reversed micellar solution I was further added and stirred for an hour. Thus, a solution containing platinum particles and cobalt hydroxide in the reversed micelles was obtained. Furthermore, carbon black (Ketjenblack EC600JD made by Ketjenblack International Corporation) of 4.2 g with a BET specific surface area of 1270 $m^2/g$ was mixed thereto and stirred for an hour, and was then stirred and matured for 24 hours.

Thereafter, centrifugal separation was performed for the precipitate for six hours by use of the centrifugal machine (CENTRIFUGE05P-20B made by Hitachi, Ltd.). A precipitate was filtered, followed by washing and rising using ethanol and water. A solid material obtained was dried for 12 hours at 85° C. under decreased pressure, pulverized in a mortar, calcinated for five hours at 930° C. under an argon atmosphere, and further calcinated for five hours at 595° C. Thus, an electrocatalyst ($Pt_{0.75}Co_{0.25}$) was obtained. Note that the reversed micellar solutions in this example were added in the order shown in FIG. 4. A mean particle diameter of the noble metal and mass activity of the catalyst in the electrocatalyst obtained is shown in FIG. 11A.

EXAMPLE 4

In a similar way to those of Examples 1 and 2, the reversed micellar solution A, the reversed micellar solution B, the reversed micellar solution E and the reversed micellar solution I were prepared.

To the reversed micellar solution A, the reversed micellar solution E was mixed, and stirred for an hour.

While stirring the mixed solution, the reversed micellar solution I was added thereto and stirred for an hour, and then the reversed micellar solution B was further added and stirred for an hour. Thus, a solution containing platinum particles and cobalt hydroxide in the reversed micelles was obtained. Furthermore, carbon black (Ketjenblack EC600JD made by Ketjenblack International Corporation) of 4.2 g with a BET specific surface area of 1270 $m^2/g$ was mixed thereto and stirred for an hour, and was then stirred and matured for 24 hours.

Thereafter, centrifugal separation was performed for the precipitate for six hours by use of the centrifugal machine (CENTRIFUGE05P-20B made by Hitachi, Ltd.). A precipitate was filtered, followed by washing and rising using ethanol and water. A solid material obtained was dried for 12 hours at 85° C. under decreased pressure, pulverized in a mortar, calcinated for five hours at 930° C. under an argon atmosphere, and further calcinated for five hours at 595° C. Thus, an electrocatalyst ($Pt_{0.75}Co_{0.25}$) was obtained. Note that the reversed micellar solutions in this example were added in the order shown in FIG. 9. A mean particle diameter of the noble metal and mass activity of the catalyst in the electrocatalyst obtained is shown in FIG. 11A.

EXAMPLE 5

In a similar way to those of Examples 1 and 2, the reversed micellar solution A, the reversed micellar solution B, the reversed micellar solution E and the reversed micellar solution I were prepared.

To the reversed micellar solution E, the reversed micellar solution I was mixed, and stirred for an hour.

While agitating the mixed solution, the reversed micellar solution A was added thereto and stirred for an hour, and then the reversed micellar solution B was further added and stirred for an hour. Thus, a solution containing platinum particles and cobalt hydroxide in the reversed micelles was obtained. Furthermore, carbon black (Ketjenblack EC600JD made by Ketjenblack International Corporation) of 4.2 g with a BET specific surface area of 1270 m$^2$/g was mixed thereto and stirred for an hour, and was then stirred and matured for 24 hours.

Thereafter, centrifugal separation was performed for the precipitate for six hours by use of the centrifugal machine (CENTRIFUGE05P-20B made by Hitachi, Ltd.). A precipitate was filtered, followed by washing and rising using ethanol and water. A solid material obtained was dried for 12 hours at 85° C. under decreased pressure, pulverized in a mortar, calcinated for five hours at 930° C. under an argon atmosphere, and further calcinated for five hours at 595° C. Thus, an electrocatalyst (Pt$_{0.75}$Cu$_{0.25}$) was obtained. Note that the reversed micellar solutions in this example were added in the order shown in FIG. 10. A mean particle diameter of the noble metal and mass activity of the catalyst in the electrocatalyst obtained is shown in FIG. 11A.

EXAMPLE 6

The reversed micellar solution E was obtained by adding a cobalt nitrate (Co(NO$_3$)$_2$·6H$_2$O) solution of 26.3 g with a cobalt nitrate concentration of 16% by mass. Other than the above, the reversed micellar solutions were prepared in a similar way to that of Example 2. Thus, an electrocatalyst (Pt$_{0.50}$Co$_{0.50}$) was obtained. A mean particle diameter of the noble metal and mass activity of the catalyst in the electrocatalyst obtained is shown in FIG. 11A.

EXAMPLE 7

Instead of the cobalt nitrate (Co(NO$_3$)$_2$.6H$_2$O) solution of 13.2 g with a cobalt nitrate concentration of 16% by mass, a chromium nitrate (Cr(NO$_3$)$_2$·9H$_2$O) solution of 18.1 g with a chromium nitrate concentration of 16% by mass was used, and thus the reversed micellar solution E was obtained. Other than the above, an electrocatalyst (Pt$_{0.75}$Cr$_{0.25}$) was obtained in a similar way to that of Example 2. A mean particle diameter of the noble metal and mass activity of the catalyst in the electrocatalyst obtained is shown in FIG. 11A.

EXAMPLE 8

Instead of the cobalt nitrate (Co(NO$_3$)$_2$·6H$_2$O) solution of 13.2 g with a cobalt nitrate concentration of 16% by mass, a manganese nitrate (Mn(NO$_3$)$_2$·6H$_2$O) solution of 13.0 g with a manganese nitrate concentration of 16% by mass was used, and thus the reversed micellar solution E was obtained. Other than the above, an operation was performed in a similar way to that of Example 2, and an electrocatalyst (Pt$_{0.75}$Mn$_{0.25}$) was obtained. A mean particle diameter of the noble metal and mass activity of the catalyst in the electrocatalyst obtained is shown in FIG. 11A.

EXAMPLE 9

Instead of the cobalt nitrate (CO(NO$_3$)$_2$·6H$_2$O) solution of 13.2 g with a cobalt nitrate concentration of 16% by mass, a ferric nitrate (Fe(NO$_3$)$_3$.9H$_2$O) solution of 18.2 g with a ferric nitrate concentration of 16% by mass was used, and thus the reversed micellar solution E was obtained. Other than the above, an operation was performed in a similar way to that of Example 2, and an electrocatalyst (Pt$_{0.75}$Fe$_{0.25}$) was obtained. A mean particle diameter of the noble metal and mass activity of the catalyst in the electrocatalyst obtained is shown in FIG. 11A.

EXAMPLE 10

Instead of the cobalt nitrate (Co(NO$_3$)$_2$·6H$_2$O) solution of 13.2 g with a cobalt nitrate concentration of 16% by mass, a nickel nitrate (Ni(O$_3$)$_2$·6H$_2$O) solution of 13.1 g with a nickel nitrate concentration of 16% by mass was used, and thus the reversed micellar solution E was obtained. Other than the above, an operation was performed in a similar way to that of Example 2, and an electrocatalyst (Pt$_{0.7}$Ni$_{0.25}$) was obtained. A mean particle diameter of the noble metal and mass activity of the catalyst in the electrocatalyst obtained is shown in FIG. 11A.

EXAMPLE 11

The reversed micellar solution A was prepared in the following manner. As a surfactant, polyoxyethylene (5) nonylphenyl ether of 44 g was used. To the surfactant, cyclohexane was added to make up to 1.0 L (0.1 mol/L), and was stirred. To a mixture thereof, a dinitrodiammine platinum nitrate solution of 52.8 g with a Pt concentration of 8% by mass was added, and was stirred for an hour until becoming transparent. Thus, the reversed micellar solution A was prepared.

The reversed micellar solution B was prepared in the following manner. As a surfactant, polyoxyethylene (5) nonylphenyl ether of 44 g was used. To the surfactant, cyclohexane was added to make up to 1.0 L (0.1 mol/L), and was stirred. To a mixture thereof, a hydrazine solution of 15 ml with a concentration of 0.5% by mass was added, and stirred for an hour. Thus, the reversed micellar solution B was prepared.

Subsequently, to the reversed micellar solution A, the reversed micellar solution B was mixed. Further, carbon black (Ketjenblack EC made by Ketjenblack International Corporation) of 12.7 g with a BET specific surface area of 805 m$^2$/g was mixed thereto and stirred for an hour, and was then stirred and matured for 24 hours.

Thereafter, centrifugal separation was performed for the precipitate for six hours by use of the centrifugal machine (CENTRIFUGE05P-20B made by Hitachi, Ltd.). A precipitate was filtered, followed by washing and rising using ethanol and water. A solid material obtained was dried for 12 hours at 85° C. under decreased pressure, pulverized in a mortar, and calcinated for five hours at 300° C. under an argon atmosphere. Thus, an electrocatalyst was obtained. Note that the reversed micellar solutions in this example were added in the order shown in FIG. 3. A mean particle diameter of the noble metal and mass activity of the catalyst in the electrocatalyst obtained is shown in FIG. 11A.

EXAMPLE 12

In a similar way to that of Example 11, the reversed micellar solution A and the reversed micellar solution B were prepared.

The reversed micellar solution E was prepared in the following manner. As a surfactant, polyoxyethylene (5) nonylphenyl ether of 44 g was used. To the surfactant, cyclohexane was added to make up to 1.0 L (0.1 mol/L), and was stirred. To a mixture thereof, a cobalt nitrate (Co(NO$_3$)$_2$·6H$_2$O) solution of 13.2 g with a cobalt nitrate concentration of 16% by mass was added, and was stirred for an hour until becoming transparent. Thus, the reversed micellar solution E was obtained.

The reversed micellar solution I was prepared in the following manner. As a surfactant, polyoxyethylene (5)

nonylphenyl ether of 44 g was used. To the surfactant, cyclohexane was added to make up to 1.0 L (0.1 mol/L), and was stirred. To a mixture thereof, a tetramethylammonium hydroxide solution of 13.2 g with a concentration of 5% by mass was added, and stirred for an hour until becoming transparent. Thus, the reversed micellar solution I was prepared.

To the reversed micellar solution A, the reversed micellar solution B was mixed and stirred for an hour. Further, carbon black (Ketjenblack EC made by Ketjenblack International Corporation) of 12.7 g with a BET specific surface area of 805 m$^2$/g was mixed thereto and stirred for an hour, and was then stirred and matured for 24 hours.

While agitating the mixed solution, the reversed micellar solution E was added thereto and stirred for an hour. The reversed micellar solution I was further added thereto and stirred for an hour, and was then stirred and matured for 24 hours.

Thereafter, centrifugal separation was performed for the precipitate for six hours by use of the centrifugal machine (CENTRIFUGE05P-20B made by Hitachi, Ltd.). A precipitate was filtered, followed by washing and rising using ethanol and water. A solid material obtained was dried for 12 hours at 85° C. under decreased pressure, pulverized in a mortar, and calcinated for two hours at 630° C. under an argon atmosphere, and further calcinated for two hours at 580° C. Thus, an electrocatalyst ($Pt_{0.75}Co_{0.25}$) was obtained. Note that the reversed micellar solutions in this example were added in the order shown in FIG. 8. A mean particle diameter of the noble metal and mass activity of the catalyst in the electrocatalyst obtained is shown in FIG. 11A.

EXAMPLE 13

In a similar way to that of Example 12, the reversed micellar solution A, the reversed micellar solution B and the reversed micellar solution I were prepared. Further, instead of the cobalt nitrate ($Co(NO_3)_2 \cdot 6H_2O$) solution of 13.2 g with a cobalt nitrate concentration of 16% by mass, a iridium chloride solution of 35.2 g with an iridium chloride concentration of 4% by mass was used, and thus the reversed micellar solution B was obtained.

To the reversed micellar solution E, the reversed micellar solution I was mixed, and stirred for an hour. Thus, a solution containing a complex compound of iridium hydroxide in the reversed micelles was obtained. To this solution, carbon black (Ketjenblack EC made by Ketjenblack International Corporation) of 12.7 g with a BET specific surface area of 805 m$^2$/g was mixed, and stirred for an hour, and was then stirred and matured for 24 hours.

While agitating the mixed solution, the reversed micellar solution A was further added thereto and stirred for an hour, and then the reversed micellar solution B was added thereto. Thus, a solution containing platinum particles in the reversed micelles was obtained. This solution was stirred for an hour, followed by agitation and maturing for 24 hours.

Thereafter, centrifugal separation was performed for the precipitate for six hours by use of the centrifugal machine (CENTRIFUGE05P-20B made by Hitachi, Ltd.). A precipitate was filtered, followed by washing and rising using ethanol and water. A solid material obtained was dried for 12 hours at 85° C. under decreased pressure, pulverized in a mortar, calcinated for two hours at 630° C. under an argon atmosphere, and further calcinated for two hours at 580° C. Thus, an electrocatalyst ($Pt_{0.75}Ir_{0.25}$) was obtained. Note that the reversed micellar solutions in this example were added in the order shown in FIG. 10. A mean particle diameter of the noble metal and mass activity of the catalyst in the electrocatalyst obtained is shown in FIG. 11A.

EXAMPLE 14

Instead of the carbon black (Ketjenblack EC made by Ketjenblack International Corporation) with a BET specific surface area of 805 m$^2$/g, Vulcan XC72 (made by Cabot Corporation) with a BET specific surface area of 280 m$^2$/g was mixed. Other than the above, an operation was performed in a similar way to that of Example 11, and thus an electrocatalyst was obtained. A mean particle diameter of the noble metal and mass activity of the catalyst in the electrocatalyst obtained is shown in FIG. 11A.

EXAMPLE 15

Instead of the carbon black (Ketjenblack EC made by Ketjenblack International Corporation) with a BET specific surface area of 805 m$^2$/g, Acetylene Black (made by Cabot Corporation) with a BET specific surface area of 120 m$^2$/g was mixed. Other than the above, an operation was performed in a similar way to that of Example 11, and thus an electrocatalyst was obtained. A mean particle diameter of the noble metal and mass activity of the catalyst in the electrocatalyst obtained is shown in FIG. 11A.

EXAMPLE 16

Instead of the carbon black (Ketjenblack EC made by Ketjenblack International Corporation) with a BET specific surface area of 805 m$^2$/g, Vulcite (made by Cabot Corporation) with a BET specific surface area of 180 m$^2$/g was mixed. Other than the above, an operation was performed in a similar way to that of Example 11, and thus an electrooatalyst was obtained. A mean particle diameter of the noble metal and mass activity of the catalyst in the electrocatalyst obtained is shown in FIG. 1A.

EXAMPLE 17

Instead of the carbon black (Ketjenblack EC made by Ketjenblack International Corporation) with a BET specific surface area of 805 m$^2$/g, Furnace Black (Denka Black made by Denki Kagaku Kogyo Kabushiki Kaisha) with a BET specific surface area of 120 m$^2$/g was mixed. Other than the above, an operation was performed in a similar way to that of Example 11, and thus an electrocatalyst was obtained. A mean particle diameter of the noble metal and mass activity of the catalyst in the electrocatalyst obtained is shown in FIG. 11A.

EXAMPLE 18

Instead of the carbon black (Ketjenblack EC made by Ketjenblack International Corporation) with a BET specific surface area of 805 m$^2$/g, graphitized Ketjenblack EC with a BET specific surface area of 125 m$^2$/g was mixed. Other than the above, an operation was performed in a similar way to that of Example 11, and thus an electrocatalyst was obtained. A mean particle diameter of the noble metal and mass activity of the catalyst in the electrocatalyst obtained is shown in FIG. 11B.

EXAMPLE 19

Instead of the carbon black (Ketjenblack EC made by Ketjenblack International Corporation) with a BET specific surface area of 805 m²/g, graphitized Ketjenblack EC600JD with a BET specific surface area of 225 m²/g was mixed. Other than the above, an operation was performed in a similar way to that of Example 11, and thus an electrocatalyst was obtained. A mean particle diameter of the noble metal and mass activity of the catalyst in the electrocatalyst obtained is shown in FIG 11B.

EXAMPLE 20

Instead of the carbon black (Ketjenblack EC made by Ketjenblack International Corporation) with a BET specific surface area of 805 m²/g, graphitized Vulcan XC72 with a BET specific surface area of 90 m²/g was mixed. Other than the above, an operation was performed in a similar way to that of Example 11, and thus an electrocatalyst was obtained. A mean particle diameter of the noble metal and mass activity of the catalyst in the electrocatalyst obtained is shown in FIG. 11B.

EXAMPLE 21

Instead of the carbon black (Ketjenblack EC made by Ketjenblack International Corporation) with a BET specific surface area of 805 m²/g, graphitized Acetylene Black with a BET specific surface area of 85 m² μg was mixed. Other than the above, an operation was performed in a similar way to that of Example 11, and thus an electrocatalyst was obtained. A mean particle diameter of the noble metal and mass activity of the catalyst in the electrocatalyst obtained is shown in FIG. 11B.

EXAMPLE 22

Instead of the carbon black (Ketjenblack BC made by Ketjenblack International Corporation) with a BET specific surface area of 805 m²/g, graphitized Furnace Black with a BET specific surface area of 88 m²/g was mixed. Other than the above, an operation was performed in a similar way to that of Example 11, and thus an electrocatalyst was obtained. A mean particle diameter of the noble metal and mass activity of the catalyst in the electrocatalyst obtained is shown in FIG. 11B.

EXAMPLE 23

Instead of the carbon black (Ketjenblack EC made by Ketjenblack International Corporation) with a BET specific surface area of 805 m²/g, graphitized Ketjenblack EC with a BET specific surface area of 125 m²/g was mixed. Other than the above, an operation was performed in a similar way to that of Example 2, and thus an electrocatalyst was obtained. Note that the graphitized Ketjenblack EC is one formed by graphitizing, at 2500–2800° C., the Ketjenblack EC (made by Ketjenblack International Corporation) with a BET specific surface area of 805 m²/g, and is carbon black with a BET specific surface area of 125 m²/g. A mean particle diameter of the noble metal and mass activity of the catalyst in the electrocatalyst obtained is shown in FIG. 11B.

EXAMPLE 24

In a similar way to those of Example 2, the reversed micellar solution A, the reversed micellar solution B, the reversed micellar solution E and the reversed micellar solution I were prepared.

To the reversed micellar solution A, the reversed micellar solution B was mixed, and stirred for an hour.

While agitating the mixed solution, the reversed micellar solution E was added thereto and stirred for an hour, and then the reversed micellar solution I was further added and stirred for an hour. Thus, a solution containing platinum particles and cobalt hydroxide in the reversed micelles was obtained. Furthermore, the graphitized Ketjenblack EC was mixed thereto and stirred for an hour, and was then stirred and matured for 24 hours.

Thereafter, centrifugal separation was performed for the precipitate for six hours by use of the centrifugal machine (CENTRIFUGE05P-20B made by Hitachi, Ltd.). A precipitate was filtered, followed by washing and rising using ethanol and water. A solid material obtained was dried for 12 hours at 85° C. under decreased pressure, pulverized in a mortar, calcinated for two hours at 630° C. under an argon atmosphere, and further calcinated for two hours at 580° C. Thus, an electrocatalyst ($Pt_{0.75}Co_{0.25}$) was obtained. Note that the reversed micellar solutions in this example were added in the order shown in FIG. 8. A mean particle diameter of the noble metal and mass activity of the catalyst in the electrocatalyst obtained is shown in FIG. 11B.

EXAMPLE 25

In a similar way to those of Example 3, the reversed micellar solution A, the reversed micellar solution B, the reversed micellar solution E and the reversed micellar solution I were prepared.

To the reversed micellar solution A, the reversed micellar solution E was mixed, and stirred for an hour.

While agitating the mixed solution, the reversed micellar solution I was added thereto and stirred for an hour, and then the reversed micellar solution B was further added and stirred for an hour. Thus, a solution containing platinum particles and cobalt hydroxide in the reversed micelles was obtained. Furthermore, the graphitized Ketjenblack EC was mixed thereto and stirred for an hour, and was then stirred and matured for 24 hours.

Thereafter, centrifugal separation was performed for the precipitate for six hours by use of the centrifugal machine (CENTRIFUGE05P-20B made by Hitachi, Ltd.). A precipitate was filtered, followed by washing and rising using ethanol and water. A solid material obtained was dried for 12 hours at 85° C. under decreased pressure, pulverized in a mortar, calcinated for two hours at 630° C. under an argon atmosphere, and further calcinated for two hours at 580° C. Thus, an electrocatalyst ($Pt_{0.75}Co_{0.25}$) was obtained. Note that the reversed micellar solutions in this example were added in the order shown in FIG. 9. A mean particle diameter of the noble metal and mass activity of the catalyst in the electrocatalyst obtained is shown in FIG. 11B.

EXAMPLE 26

In a similar way to those of Example 4, the reversed micellar solution A, the reversed micellar solution B the reversed micellar solution E and the reversed micellar solution I were prepared.

To the reversed micellar solution E, the reversed micellar solution I was mixed, and stirred for an hour.

While agitating the mixed solution, the reversed micellar solution A was added thereto and stirred for an hour, and then the reversed micellar solution B was further added and stirred for an hour. Thus, a solution containing platinum particles and cobalt hydroxide in the reversed micelles was obtained. Furthermore, the graphitized Ketjenblack EC was mixed thereto and stirred for an hour, and was then stirred and matured for 24 hours.

Thereafter, centrifugal separation was performed for the precipitate for six hours by use of the centrifugal machine (CENTRIFUGE05P-20B made by Hitachi, Ltd.). A precipitate was filtered, followed by washing and rising using ethanol and water. A solid material obtained was dried for 12 hours at 85° C. under decreased pressure, pulverized in a mortar, calcinated for two hours at 630° C. under an argon atmosphere, and further calcinated for two hours at 580° C. Thus, an electrocatalyst ($Pt_{0.75}Co_{0.25}$) was obtained. Note that the reversed micellar solutions in this example were added in the order shown in FIG. 10. A mean particle diameter of the noble metal and mass activity of the catalyst in the electrocatalyst obtained is shown in FIG. 11B.

EXAMPLE 27

A cobalt nitrate ($Co(NO_3)_2 \cdot 6H_2O$) solution of 13.2 g with a cobalt nitrate concentration of 16% by mass was added, and thus the reversed micellar solution E was obtained. Other than the above, an operation was performed in a similar way to that of Example 24, and an electrocatalyst ($Pt_{0.50}Co_{0.50}$) was obtained. A mean particle diameter of the noble metal and mass activity of the catalyst in the electrocatalyst obtained is shown in FIG. 11B.

EXAMPLE 28

Instead of the cobalt nitrate ($Co(NO_3)_2 \cdot 6H_2O$) solution of 13.2 g with a cobalt nitrate concentration of 16% by mass, a chromium nitrate ($Cr(NO_3)_2 \cdot 9HaO$) solution of 18.1 g with a chromium nitrate concentration of 16% by mass was used, and thus the reversed micellar solution E was obtained. Other than the above, an operation was performed in a similar way to that of Example 24, and thus an electrocatalyst ($Pt_{0.75}Cr_{0.25}$) was obtained. A mean particle diameter of the noble metal and mass activity of the catalyst in the electrocatalyst obtained is shown in FIG. 11B.

EXAMPLE 29

Instead of the cobalt nitrate ($Co(NO_3)_2 \cdot 6H_2O$) solution of 13.2 g with a cobalt nitrate concentration of 16% by mass, a manganese nitrate ($Mn(NO_3)_2 \cdot 6H_2O$) solution of 13.0 g with a manganese nitrate concentration of 16% by mass was used, and thus the reversed micellar solution E was obtained. Other than the above, an operation was performed in a similar way to that of Example 24, and thus an electrocatalyst ($Pt_{0.75}Mn_{0.25}$) was obtained. A mean particle diameter of the noble metal and mass activity of the catalyst in the electrocatalyst obtained is shown in FIG. 1B.

EXAMPLE 30

Instead of the cobalt nitrate ($Co(NO_3)_2 \cdot 6H_2O$) solution of 13.2 g with a cobalt nitrate concentration of 16% by mass, a ferric nitrate ($Fe(NO_3)_3 \cdot 9H_2O$) solution of 18.2 g with a ferric nitrate concentration of 16% by mass was used, and thus the reversed micellar solution E was obtained. Other than the above, an operation was performed in a similar way to that of Example 24, and thus an electrocatalyst ($Pt_{0.75}Fe_{0.25}$) was obtained. A mean particle diameter of the noble metal and mass activity of the catalyst in the electrocatalyst obtained is shown in FIG. 11B.

EXAMPLE 31

Instead of the cobalt nitrate ($Co(NO_3)_2 \cdot 6H_2O$) solution of 13.2 g with a cobalt nitrate concentration of 16% by mass, a nickel nitrate ($Ni(NO_3)_2 \cdot 6H_2O$) solution of 13.1 g with a nickel nitrate concentration of 16% by mass was used, and thus the reversed micellar solution E was obtained. Other than the above, an operation was performed in a similar way to that of Example 24, and thus an electrocatalyst ($Pt_{0.75}Ni_{0.25}$) was obtained. A mean particle diameter of the noble metal and mass activity of the catalyst in the electrocatalyst obtained is shown in FIG. 11B.

EXAMPLE 32

Instead of the carbon black (Ketjenblack EC made by Ketjenblack International Corporation) with a BET specific surface area of 805 $m^2/g$, the graphitized carbon black (graphitized Ketjenblack EC with a BET specific surface area of 125 $m^2/g$, which is formed by graphitizing the Ketjenblack BC with a BET specific surface area of 805 $m^2/g$, made by Ketjenblack International Corporation) was used. Other than the above, an operation was performed in a similar way to that of Example 13, and thus an electrocatalyst ($Pt_{0.75}Ir_{0.25}$) was obtained. A mean particle diameter of the noble metal and mass activity of the catalyst in the electrocatalyst obtained is shown in FIG. 11B.

COMPARATIVE EXAMPLE 1

To a solution of chloroplatinic acid of 250 g, which contained platinum of 0.4% by mass, carbon black (Vulcan XC-72 made by Cabot Corporation) of 1.0 g was added, and sufficiently dispersed by using a homogenizer. To this liquid, sodium citrate of 3 g was further added, heated up to 80° C. by using a reflux reactor, and thus reduction loading of the platinum were performed. Then, the precipitate was cooled to room temperature, followed by filtering of the carbon on which the platinum was loaded. Thus, an electrocatalyst formed of the platinum-loaded carbon (loaded amount of Pt: 50% by mass) was obtained. A mean particle diameter of the noble metal and mass activity of the catalyst in the electrocatalyst obtained is shown in FIG. 11B.

COMPARATIVE EXAMPLE 2

The platinum-loaded carbon (loaded amount of Pt: 50% by mass) of 2.0 g, which was obtained in Comparative example 1, was sufficiently dispersed in a cobalt nitrate solution of 50 ml with a cobalt nitrate concentration of 1.0% by mass. Then, moisture was evaporated from the solution by heating stir, and thus loading of Co was performed. Subsequently, the precipitate was held for four hours at 900° C. in a flow of nitrogen containing $H_2$ of 5% to be subjected to an alloying process, and an electrocatalyst ($Pt_{0.75}Co_{0.25}$) was formed. A mean particle diameter of the noble metal and mass activity of the catalyst in the electrocatalyst obtained is shown in FIG. 11B.

COMPARATIVE EXAMPLES 3 AND 4

Instead of the carbon black (Vulcan XC-72 made by Cabot Corporation), carbon black (Ketjenblack EC600JD made by Ketjenblack International Corporation) with a BET specific surface area of 1270 m$^2$/g was used. Other than the above, operations were made in similar ways to those of Comparative examples 1 and 2, and thus each electrocatalyst was obtained. A mean particle diameter of the noble metal and mass activity of the catalyst in the electrocatalyst obtained is shown in FIG. 11B.

COMPARATIVE EXAMPLES 5 AND 6

Instead of the carbon black (Vulcan XC-72 made by Cabot Corporation), graphitized Ketjenblack EC with a BET specific surface area of 125 m$^2$/g was used. Other than the above, operations were made in similar ways to those of Comparative examples 1 and 2, and thus each electrocatalyst was obtained. Results are shown in FIG. 11B.

(Performance Evaluation of Electrocatalyst)

For the electrocatalysts obtained in the respective Examples 1 to 32 and Comparative examples 1 to 6, membrane electrode assemblies (MEAs) were fabricated, and single cells of the fuel cells were measured in performance.

The MEAs were fabricated according to the following procedure.

With regard to a cathode, to the electrocatalyst according to each of the examples and comparative examples, purified water and 2-propanol were added, and an ionomer solution containing Nafion (registered trademark) was added so that an amount of ionomer content can be equal to weight of the carbon. Then, a mixed solution was sufficiently dispersed by a homogenizer, and further subjected to defoaming. Thus, catalyst slurry was prepared. A predetermined amount of the catalyst slurry was printed by a screen printing method on one surface of carbon paper ("TGP-H" made by Toray Industries, Inc.) that is a gas diffusion layer, and was then dried for 24 hours at 60° C. Thereafter, the surface on which the catalyst layer was coated was set to an electrolyte membrane, and was hot-pressed for three minutes at 120° C. with 0.2 MPa. In such a way, each MEA was fabricated. Meanwhile, with regard to an anode, each MBA was fabricated by using carbon which loads thereon platinum of 50% as an electrocatalyst in a similar manner to that for the cathode.

In these MEAs for both of the anode and the cathode, usage amounts of platinum were set at 0.5 mg per apparent electrode area of 1 cm$^2$, and an area of each electrode was set at 300 cm$^2$. Moreover, as each electrolyte membrane, Nafion 112 was used.

The single cell of the fuel cell, which was thus obtained, was measured in performance according to the following procedure. Note that, in the event of measurement, hydrogen was supplied as fuel to the anode side, and the air was supplied to the cathode side. Supply pressures for both of the gases were set at the atmospheric pressure. The hydrogen and the air were humidified so as to be saturated at 80° C. and 60° C., respectively, and cell temperature was set at 80° C. Utilizations of the hydrogen and air were set assumed at 70% and 40%, respectively. Under these conditions, I-V (current density-cell voltage) characteristics were measured. As results of the measurement, the mass activities of the single cells using the electrocatalysts according to the respective examples and comparative examples are shown in FIG. 11. Note that, in FIG. 11, the "mass activity" is one of indices indicating the performance of the electrocatalyst in the fuel cell, and in general, a current value per Pt of 1 g at a cell voltage of 0.9V. It can be said that the performance of the electrocatalyst is higher as a value of the mass activity is larger.

When comparison is made between the mass activity value of the cell using the electrocatalyst of the present invention and the mass activity value of the cell using the conventional electrocatalyst, the mass activity of the electrocatalyst of the present invention, which solely uses platinum as the noble metal (Example 1), is higher than that of the conventional electrocatalyst solely using platinum as the noble metal (Comparative example 1). In addition, even in the case where the transition metal is contained in the electrocatalyst, the mass activity of the electrocatalyst of the present invention is higher (refer to Example 2 and Comparative example 4). From these, it is understood that the catalyst activity is improved to a great extent by loading the metal thereon by use of the reversed micelle method.

The entire contents of Japanese Patent Applications No. P2003-270469 with a filing date of Jul. 2, 2003 and No. P2004-151927 with a filing date of May 21, 2004 are herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A method of manufacturing an electrocatalyst, comprising:
   preparing a reversed micellar solution containing an aqueous solution of a noble metal ion;
   reducing the noble metal ion to a noble metal by adding a reducing agent to the reversed micellar solution; and
   adding a conductive support to the reversed micellar solution,
   wherein the reducing agent is added as a reversed micellar solution containing an aqueous solution of the reducing agent.

2. A method of manufacturing an electrocatalyst according to claim 1,
   wherein, after preparing the reversed micellar solution, the reducing agent is added thereto, and a conductive support is then added thereto.

3. A method of manufacturing an electrocatalyst according to claim 1,
   wherein, after preparing the reversed micellar solution, the conductive support is added thereto, and the reducing agent is then added thereto.

4. A method of manufacturing an electrocatalyst according to claim 1,
   wherein the noble metal comprises at least one noble metal selected from the group consisting of platinum, palladium, rhodium, osmium, ruthenium and iridium.

5. A method of manufacturing an electrocatalyst according to claim 1,
   wherein the conductive support comprises carbon particles with a BET specific surface area ranging from 80 to 2000 m$^2$/g.

6. A method of manufacturing an electrocatalyst according to claim 1,
   further comprising rinsing off an attachment on a surface of the support with an alkaline solution.

7. A method of manufacturing an electrocatalyst according to claim 1, further comprising:
separating the conductive support which the noble metal loaded thereon;
rinsing and drying the conductive support filtered; and
calcinating the conductive support by drying at 600 to 1100° C. under an inert atmosphere, and further holding the conductive support at 400 to 600° C.

8. A method of manufacturing an electrocatalyst according to claim 1,
wherein the aqueous solution contains ions of two or more different noble metals.

9. A method of manufacturing an electrocatalyst, comprising:
preparing a first reversed micellar solution containing an aqueous solution of a noble metal ion;
reducing the noble metal ion to a noble metal by adding a reducing agent to the first reversed micellar solution;
preparing a second reversed micellar solution containing an aqueous solution of a transition metal ion;
preparing a transition metal from the transition metal ion by adding a precipitant to the second reversed micellar solution; and
loading a complex metal particle composed of the noble metal and the transition metal on a conductive support.

10. A method of manufacturing an electrocatalyst according to claim 9,
wherein, after adding the reducing agent to the first reversed micellar solution, the second reversed micellar solution is added thereto, and the precipitant is then added thereto, so that the complex metal particles are generated, and
the complex metal particles are loaded on the conductive support by dispersing the conductive support into a solution containing the complex metal particles.

11. A method of manufacturing an electrocatalyst according to claim 9,
wherein, after adding the second reversed micellar solution to the first reversed micellar solution, the reducing agent is added, and the precipitant is then added, so that the complex metal particles are generated, and
the complex metal particles are loaded on the conductive support by dispersing the conductive support into a solution containing the complex metal particles.

12. A method of manufacturing an electrocatalyst according to claim 9,
wherein, after adding the second reversed micellar solution to the first reversed micellar solution, the precipitant is added, and the reducing agent is then added, so that the complex metal particles are generated, and
the complex metal particles are loaded on the conductive support by dispersing the conductive support into a solution containing the complex metal particles.

13. A method of manufacturing an electrocatalyst according to claim 9,
wherein, after adding the precipitant to the second reversed micellar solution, the first reversed micellar solution is added, and the reducing agent is then added, so that the complex metal particle are generated, and
the complex metal particle are loaded on the conductive support by dispersing the conductive support into a solution containing the complex metal particle.

14. A method of manufacturing an electrocatalyst according to claim 9,
wherein, after adding the conductive support to the first reversed micellar solution, and dispersing micelles containing the aqueous solution of the noble metal ion onto a surface of the conductive support, the second reversed micellar solution is added, the reducing agent is then added, and subsequently, the precipitant is added.

15. A method of manufacturing an electrocatalyst according to claim 9,
wherein, after adding the conductive support to the first reversed micellar solution, and dispersing micelles containing the aqueous solution of the noble metal ion onto a surface of the conductive support, the second reversed micellar solution is added, the precipitant is then added, and subsequently, the reducing agent is added.

16. A method of manufacturing an electrocatalyst according to claim 9,
wherein, after adding the conductive support to the first reversed micellar solution, and dispersing micelles containing the aqueous solution of the noble metal ion onto a surface of the conductive support, the reducing agent is added, the second reversed micellar solution is then added, and subsequently, the precipitant is added.

17. A method of manufacturing an electrocatalyst according to claim 9,
wherein, after adding the conductive support to the second reversed micellar solution, and dispersing micelles containing the aqueous solution of the transition metal ion onto a surface of the conductive support, the precipitant is added, the first reversed micellar solution is then added, and subsequently, the reducing agent is added.

18. A method of manufacturing an electrocatalyst according to claim 9,
wherein the noble metal is at least one noble metal selected from the group consisting of platinum, palladium, rhodium, osmium, ruthenium and iridium.

19. A method of manufacturing an electrocatalyst according to claim 9,
wherein the conductive support comprises carbon particles with a BET specific surface area of 80 to 2000 $m^2/g$.

20. A method of manufacturing an electrocatalyst according to claim 9,
wherein the transition metal comprises at least one transition metal selected from the group consisting of vanadium, chromium, manganese, iron, cobalt, nickel, copper and zinc.

21. A method of manufacturing an electrocatalyst according to claim 9,
further comprising rinsing off an attachment on a surface of the support with an alkaline solution.

22. A method of manufacturing an electrocatalyst according to claim 9, further comprising:
separating the conductive support which the noble metal loaded thereon;
rinsing and drying the conductive support filtered; and
calcinating the conductive support drying at 600 to 1100° C. under an inert atmosphere, and further holding the conductive support at 400 to 600° C.

23. A method of manufacturing an electrocatalyst according to claim 9,
wherein the reducing agent is added as a reversed micellar solution containing an aqueous solution of the reducing agent, and
the precipitant is added as a reversed micellar solution containing an aqueous solution of the precipitant.

24. A method of manufacturing an electrocaralyst, comprising:
- preparing a reversed micellar solution containing an aqueous solution of a noble metal ion;
- reducing the noble metal ion to a noble metal by adding a reducing agent to the reversed micellar solution;
- rinsing off an attachment on a surface of a conductive support with an alkaline solution; and
- adding the support to the reversed micellar solution.

25. A method of manufacturing an electrocatalyst according to claim 24,
wherein, after preparing the reversed micellar solution, the reducing agent is added thereto, and a conductive support is then added thereto.

26. A method of manufacturing an electrocatalyst according to claim 24,
wherein, after preparing the reversed micellar solution, the conductive support is added thereto, and the reducing agent is then added thereto.

27. A method of manufacturing an electrocatalyst according to claim 24, wherein the noble metal comprises at least one noble metal selected from the group consisting of platinum, palladium, rhodium, osmium, ruthenium and iridium.

28. A method of manufacturing an electrocatalyst according to claim 24, wherein the conductive support comprises carbon panicles with a BET specific surface area ranging from 80 to 2000 $m^2/g$.

29. A method of manufacturing an electrocatalyst according to claim 24, further comprising:
- separating the conductive support with the noble metal loaded thereon;
- rinsing and drying the separated conductive support; and
- calcinating the separated conductive support by drying at 600 to 1100° C. under an inert atmosphere, and further holding the separated conductive support ax 400 to 600° C.

30. A method of manufacturing an electrocatalyst according to claim 24, wherein the aqueous solution contains ions of two or more different noble metals.

* * * * *